United States Patent
Ma et al.

(10) Patent No.: US 11,264,181 B2
(45) Date of Patent: Mar. 1, 2022

(54) MIXED CONDUCTOR, ELECTROCHEMICAL DEVICE, AND METHOD OF PREPARING MIXED CONDUCTOR

(71) Applicant: Samsung Electronics Co., Ltd., Suwon-si (KR)

(72) Inventors: Sangbok Ma, Suwon-si (KR); Hyukjae Kwon, Suwon-si (KR); Hyunpyo Lee, Seoul (KR); Donghwa Seo, Burlington, MA (US); Dongmin Im, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/595,728

(22) Filed: Oct. 8, 2019

(65) Prior Publication Data

US 2020/0118769 A1    Apr. 16, 2020

Related U.S. Application Data

(60) Provisional application No. 62/744,618, filed on Oct. 11, 2018.

(30) Foreign Application Priority Data

Oct. 12, 2018  (KR) .......................... 10-2018-0122039

(51) Int. Cl.
*H01M 4/485*  (2010.01)
*H01M 4/505*  (2010.01)
(Continued)

(52) U.S. Cl.
CPC .......... *H01G 11/46* (2013.01); *C01G 23/005* (2013.01); *C01G 30/002* (2013.01); *C01G 33/006* (2013.01); *C01G 35/006* (2013.01); *C01G 45/1292* (2013.01); *C01G 51/42* (2013.01); *C01G 55/002* (2013.01); *G02F 1/1524* (2019.01); *H01G 11/06* (2013.01);
(Continued)

(58) Field of Classification Search
CPC .. H01M 12/08; H01M 2004/027; H01M 4/02; H01M 4/485; H01M 4/505; H01M 4/525; H01M 4/62
See application file for complete search history.

(56) References Cited

U.S. PATENT DOCUMENTS 7,815,819 B2    10/2010    Ravet et al.
9,017,883 B2    4/2015    Han
(Continued)

OTHER PUBLICATIONS

Z. Zhong. Synthesis of Mo4+ Substituted Spinel Li4Ti5—xMoxO12, Electrochemical and Solid-State Letters, 10(12) A267-A269 (2007).*

(Continued)

*Primary Examiner* — Carlos Barcena
(74) *Attorney, Agent, or Firm* — Cantor Colburn LLP

(57) ABSTRACT

A mixed conductor represented by Formula 1:

$$A_{4+x}Ti_{5-y}G_zO_{12-\delta} \qquad \text{Formula 1}$$

wherein, in Formula 1, A is a monovalent cation, G is at least one of a monovalent cation, a divalent cation, a trivalent cation, a tetravalent cation, a pentavalent cation, or a hexavalent cation, with the proviso that G is not Ti or Cr, wherein $0<x<2$, $0.3<y<5$, $0<z<5$, and $0<\delta\leq 3$.

25 Claims, 8 Drawing Sheets

(51) Int. Cl.
*H01M 4/525* (2010.01)
*H01M 12/08* (2006.01)
*H01G 11/46* (2013.01)
*G02F 1/1524* (2019.01)
*C01G 23/00* (2006.01)
*C01G 30/00* (2006.01)
*C01G 33/00* (2006.01)
*C01G 35/00* (2006.01)
*C01G 45/12* (2006.01)
*C01G 51/00* (2006.01)
*C01G 55/00* (2006.01)
*H01G 11/06* (2013.01)
*H01G 11/50* (2013.01)
*H01G 11/86* (2013.01)
*H01M 4/02* (2006.01)

(52) U.S. Cl.
CPC ............ *H01G 11/50* (2013.01); *H01G 11/86* (2013.01); *H01M 4/485* (2013.01); *H01M 4/505* (2013.01); *H01M 4/525* (2013.01); *H01M 12/08* (2013.01); *C01P 2002/32* (2013.01); *C01P 2002/72* (2013.01); *C01P 2006/40* (2013.01); *H01M 2004/027* (2013.01)

(56) References Cited

U.S. PATENT DOCUMENTS

| | | |
|---|---|---|
| 9,083,043 B2 | 7/2015 | Ogihara et al. |
| 9,647,265 B2 | 5/2017 | Eisele et al. |
| 2011/0262809 A1* | 10/2011 | Kumagai ............ C01G 33/006 |
| | | 429/211 |
| 2013/0189572 A1* | 7/2013 | Han ...................... H01M 4/485 |
| | | 429/188 |
| 2014/0295247 A1* | 10/2014 | Yoshima ............... H01M 4/485 |
| | | 429/156 |
| 2014/0312269 A1* | 10/2014 | Laumann ............. C01G 23/002 |
| | | 252/182.1 |
| 2015/0295225 A1 | 10/2015 | Thompson et al. |
| 2016/0141617 A1 | 5/2016 | Verma et al. |
| 2016/0344024 A1 | 11/2016 | Lee et al. |
| 2019/0006667 A1* | 1/2019 | Nechev ................. H01M 4/525 |

OTHER PUBLICATIONS

P. Birke, S. Döring, S. Scharner, W. Weppner. Characterization of Thin Film Lithium Electrode Materials, Ionics 2 (1996), 329-345.*

Ganapathy et al,. "The Fine Line between a Two-Phase and Solid-Solution Phase Transformation and Highly Mobile Phase Interfaces in Spinel $Li_{4+x}Ti_5O_2$", Advanced Science News, 7, 2017, 1601781.

Chen et al., "Studies of Mg-Substituted $Li_4$—$xMg_xTi_5O_{12}$ Spinel Electrodes ($0 \leq x \leq 1$) for Lithium Batteries", Journal of The Electrochemical Society, 148 (1), 2001, A102-A104.

European Search Report for European Patent Application No. 19201891.9 dated Jul. 3, 2020.

Nasara et al., "One-Step Synthesis of Highly Oxygen-Deficient Lithium Titanate Oxide with Conformal Amorphous Carbon Coating as Anode Material for Lithium Ion Batteries", Adv. Mater. Interfaces, 4, 2017, 1700329.

Shenouda et al., "Electrochemical properties of doped lithium titanate compounds and their performance in Lithium rechargeable batteries", Journal of Power Sources, 176, 2008, pp. 332-339.

* cited by examiner

MIXED CONDUCTOR, ELECTROCHEMICAL DEVICE, AND METHOD OF PREPARING MIXED CONDUCTOR

CROSS-REFERENCE TO RELATED APPLICATION

This application claims the benefit of Provisional U.S. Patent Application No. 62/744,618, filed on Oct. 11, 2018, in the U.S. Patent and Trademark Office, and Korean Patent Application No. 10-2018-0122039, filed on Oct. 12, 2018, in the Korean Intellectual Property Office, and all the benefits accruing therefrom under 35 U.S.C. § 119, the content of which is incorporated herein in its entirety by reference.

BACKGROUND

1. Field

The present disclosure relates to a mixed conductor, i.e., a material having both electronic and ionic conductivity, an electrochemical device including the mixed conductor, and a method of preparing the mixed conductor.

2. Description of the Related Art

In an electrochemical device, such as a battery, ions and electrons migrate through separate transfer pathways between a positive electrode and a negative electrode, and an electrochemical reaction occurs as the ions and electrons are combined at an electrode.

An electrode includes both an ionic conductor for ion transfer and an electronic conductor for electron transfer. For example, in an electrode, an organic liquid electrolyte may be used as an ionic conductor, and a carbonaceous conductive agent may be used as an electronic conductor. An organic liquid electrolyte and a carbonaceous conductive agent may be easily decomposed by a radical generated during an electrochemical reaction, deteriorating the performance of the battery. The carbonaceous conductive agent in an electrode hinders ion transfer/diffusion, and the liquid electrolyte hinders electron transfer, thereby increasing an internal resistance of a battery.

Therefore, there is a need for a conductor having improved stability against by-products of electrochemical reactions and which transfers ions and electrons simultaneously.

SUMMARY

Provided is a mixed conductor that is chemically stable and transfers ions and electrons simultaneously.

Provided is an electrochemical device including the mixed conductor.

Provided is a method of preparing the mixed conductor.

Additional aspects will be set forth in part in the description which follows and, in part, will be apparent from the description, or may be learned by practice of the presented embodiments.

According to an aspect of an embodiment, a mixed conductor may be represented by Formula 1:

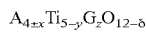

Formula 1 wherein, in Formula 1,
A is a monovalent cation,
G is at least one of a monovalent cation, a divalent cation, a trivalent cation, a tetravalent cation, a pentavalent cation, or a hexavalent cation, with the proviso that G is not Ti or Cr, and
wherein $0<x<2$, $0.3<y<5$, $0<z<5$, and $0<\delta\leq3$.

Disclosed is an electrode including the mixed conductor.

According to an aspect of another embodiment, an electrochemical device includes a positive electrode; a negative electrode including the electrode; and a separator between the positive electrode and the negative electrode.

According to an aspect of still another embodiment, a method of preparing a mixed conductor includes: providing a mixture including an element A precursor, a titanium precursor, and an element G precursor, wherein the element A precursor provides a monovalent cation, and the element G precursor provides at least one of a monovalent cation, a divalent cation, a trivalent cation, a tetravalent cation, a pentavalent cation, or a hexavalent cation, with the proviso that G is not Ti or Cr; and heat-treating the mixture to prepare the mixed conductor.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
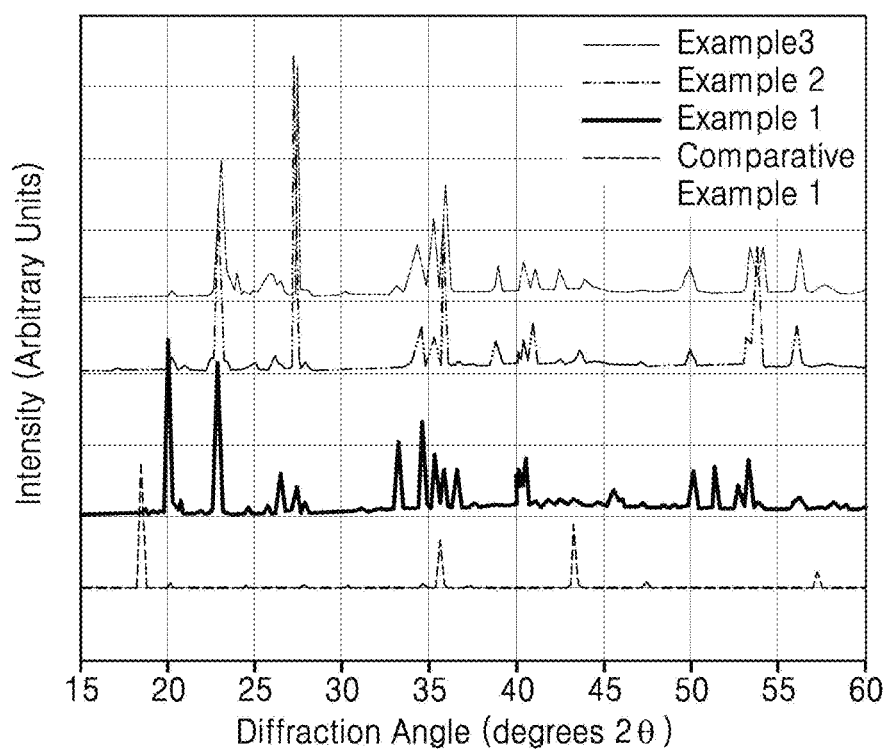
FIG. 1 is a graph of intensity (arbitrary units) versus diffraction angle (degrees 2θ) which illustrates the results of X-ray diffraction (XRD) analysis of mixed conductors prepared in Examples 1 to 3 and Comparative Example 1.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items.

As the present inventive concept allows for various changes and numerous embodiments, particular embodiments will be illustrated in the drawings and described in detail in the written description. However, this is not intended to limit the present inventive concept to particular modes of practice, and it is to be appreciated that all changes, equivalents, and substitutes that do not depart from the spirit and technical scope of the present inventive concept are encompassed in the present inventive concept.

The terms used in the present specification are merely used to describe particular embodiments, and are not intended be limiting. An expression used in the singular encompasses the expression of the plural, unless it has a clearly different meaning in the context. As used herein, the singular forms "a," "an," and "the" are intended to include the plural forms, including "at least one," unless the content clearly indicates otherwise. In the present specification, it is to be understood that the terms such as "including", "having," or the like, are intended to indicate the existence of the features, numbers, steps, actions, components, parts, ingredients, materials, or combinations thereof disclosed in the specification, and are not intended to preclude the possibility that one or more other features, numbers, steps, actions, components, parts, ingredients, materials, or combinations thereof may exist or may be added. As used herein, "/" may be construed, depending on the context, as referring to "and" or "or". "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

In the drawings, the thicknesses of layers and regions are exaggerated or reduced for clarity. Like reference numerals in the drawings and specification denote like elements. In the present specification, it will be understood that when an element, e.g., a layer, a film, a region, or a substrate, is referred to as being "on" or "above" another element, it can be directly on the other element or intervening layers may also be present. While such terms as "first," "second," or the like, may be used to describe various components, such components must not be limited to the above terms. The above terms are used only to distinguish one component from another.

The term "mixed conductor" as used herein refers a conductor that simultaneously provides both ionic conductivity and electronic conductivity. For example, the mixed conductor simultaneously provides both ionic conductivity and electronic conductivity that are improved as compared with $Li_4Ti_5O_{12}$.

"Spinel structure" or a "spinel-type" structure, as would be understood by an artisan in the solid state sciences and as is used herein, means that the compound is isostructural with spinel, i.e., $MgAl_2O_4$.

Hereinafter, according to example embodiments, a mixed conductor, an electrochemical device including the mixed conductor, and a method of preparing the mixed conductor will be described in further detail.

A mixed conductor according to an embodiment may be represented by Formula 1.

$$A_{4\pm x}Ti_{5-y}G_zO_{12-\delta} \quad \text{Formula 1}$$

wherein, in Formula 1, A may be a monovalent cation, G may be at least one of a monovalent cation, a divalent cation, a trivalent cation, a tetravalent cation, a pentavalent cation, or a hexavalent cation, with the proviso that G is not Ti or Cr, and wherein $0<x<2$, $0.3<y<5$, $0<z<5$, and $0<\delta\leq3$. $\delta$ represents a content of an oxygen vacancy. When $\delta$ is greater than 0, the mixed conductor contains an oxygen vacancy.

The mixed conductor, which includes an element A being a monovalent cation; a Ti element; and an element G being at least one of a monovalent cation, a divalent cation, a trivalent cation, a tetravalent cation, a pentavalent cation, or a hexavalent cation, at above-described composition, and an oxygen vacancy, provides an unexpected combination of ionic conductivity and electronic conductivity. While not wanting to be bound by theory, it is understood that the ionic conductivity and electronic conductivity result from the inclusion of the cationic elements and the oxygen vacancy content. Also, the mixed conductor provides unexpected chemical stability against radicals or the like, which are understood to be generated during electrochemical reactions. While not wanting to be bound by theory, it is understood that the improved stability is because the mixed conductor is an inorganic oxide, as opposed to an organic compound.

In an aspect, A in Formula 1 may be a monovalent alkali metal cation. A in Formula 1 may be, for example, at least one of Li, Na, or K. In an aspect, A is Li.

In an aspect G may be at least one of a divalent cation, a trivalent cation, a tetravalent cation, a pentavalent cation, or a hexavalent cation, with the proviso that G is not Ti or Cr. G in Formula 1 may include, for example, at least one of Mg, Ca, Sr, Sc, Y, La, Ce, Pr, Nd, Sm, Eu, Gd, Tb, Dy, Ho, Er, Tm, Yb, Lu, Zr, Hf, V, Nb, Ta, Mo, W, Mn, Tc, Re, Fe, Ru, Os, Co, Rh, Ir, Ni, Pd, Pt, Cu, Ag, Au, Zn, Cd, Hg, Al, Ga, In, Tl, Ge, Sn, Pb, Sb, Bi, Po, As, Se, or Te. In an aspect, G is at least one of a Group 5 element, a Group 7 element, a Group 9 element, a Group 11 element, a Group 13 element, or a lanthanide element. An aspect in which G is at least one of Nb, Ta, Gd, In, Co, Mn, or Cu is mentioned. In an aspect, G is Nb, Ta, Gd, In, Co, Mn, or Cu. In an aspect, G is Nb, Ta, Gd, or In.

In Formula 1, x may be $0<x<2$, $0.1<x<1.9$, $0<x<1.8$, $0.2<x<1.7$, $0.3<x<1.6$, or $0.5<x<1.5$. In an aspect, $0.1\leq x\leq1.9$, $0.1\leq x\leq1.8$, $0.2\leq x\leq1.7$, $0.3\leq x\leq1.6$, or $0.5\leq x\leq1.5$. In an aspect, x is 0.5 or 1.

In Formula 1, y may be $0.3<y<5$, $0.4<y<4.5$, $0.5<y<4$, $0.6<y<3.5$, $0.7<y<3$, $0.8<y<2.5$, or $0.9<y<2$. In an aspect, $0.35\leq y\leq4.5$, $0.4\leq y\leq4.5$, $0.5\leq y\leq4$, $0.6\leq y\leq3.5$, $0.7\leq y\leq3$, $0.8\leq y\leq2.5$, or $0.9\leq y\leq2$. In an aspect, y is 0.5 or 1.

In Formula 1, z may be $0<z<5$, $0.1<z<4.5$, $0.2<z<4$, $0.3<z<3.5$, $0.4<z<3$, $0.5<z<2.5$, or $0.6<z<2$. In an aspect, $0.1\leq z\leq4.5$, $0.2\leq z\leq4$, $0.3\leq z\leq3.5$, $0.4\leq z\leq3$, $0.5\leq z\leq2.5$, or $0.6\leq z\leq2$. In an aspect, z is 0.5 or 1.

As noted above $\delta$ may represent a content of an oxygen vacancy. $\delta$ may be $0<\delta\leq3$, $0.1<\delta\leq2$, $0.2<\delta\leq1.5$, $0.3<\delta\leq1$, or $0.4<\delta\leq0.5$. In an aspect, $\delta$ may be $0<\delta\leq3$, $0<\delta\leq2$, $0<\delta\leq1.5$, $0<\delta\leq1$, $0<\delta\leq0.5$, or $0<\delta\leq0.3$.

The mixed conductor may include, for example, at least one selected from $Li_{4\pm x}Ti_{5-y}Mg_zO_{12-\delta}$ (wherein $0.4<x\leq1$, $0.4<y\leq 1$, $0.4<z\leq 1$, and $0<\delta$), $Li_{4\pm x}Ti_{5-y}Ca_zO_{12-\delta}$ (wherein $0.4<x\leq 1$, $0.4<y\leq 1$, $0.4<z\leq 1$, and $0<\delta$), $Li_{4\pm x}Ti_{5-y}Sr_zO_{12-\delta}$ (wherein $0.4<x\leq 1$, $0.4<y\leq 1$, $0.4<z\leq 1$, and $0<\delta$), $Li_{4\pm x}Ti_{5-y}Sc_zO_{12-\delta}$ (wherein $0.4<x\leq 1$, $0.4<y\leq 1$, $0.4<z\leq 1$, and $0<\delta$), $Li_{4\pm x}Ti_{5-y}Y_zO_{12-\delta}$ (wherein $0.4<x\leq 1$, $0.4<y\leq 1$, $0.4<z\leq 1$, and $0<\delta$), $Li_{4\pm x}Ti_{5-y}La_zO_{12-\delta}$ (wherein $0.4<x\leq 1$, $0.4<y\leq 1$, $0.4<z\leq 1$, and $0<\delta$), $Li_{4\pm x}Ti_{5-y}Ce_zO_{12-\delta}$ (wherein $0.4<x\leq 1$, $0.4<y\leq 1$, $0.4<z\leq 1$, and $0<\delta$), $Li_{4\pm x}Ti_{5-y}Pr_zO_{12-\delta}$ (wherein $0.4<x\leq 1$, $0.4<y\leq 1$, $0.4<z\leq 1$, and $0<\delta$), $Li_{4\pm x}Ti_{5-y}Nd_zO_{12-\delta}$ (wherein $0.4<x\leq 1$, $0.4<y\leq 1$, $0.4<z\leq 1$, and $0<\delta$), $Li_{4\pm x}Ti_{5-y}Sm_zO_{12-\delta}$ (wherein $0.4<x\leq 1$, $0.4<y\leq 1$, $0.4<z\leq 1$, and $0<\delta$), $Li_{4\pm x}Ti_{5-y}Eu_zO_{12-\delta}$ (wherein $0.4<x\leq 1$, $0.4<y\leq 1$, $0.4<z\leq 1$, and $0<\delta$), $Li_{4\pm x}Ti_{5-y}Gd_zO_{12-\delta}$ (wherein $0.4<x\leq 1$, $0.4<y\leq 1$, $0.4<z\leq 1$, and $0<\delta$), $Li_{4\pm x}Ti_{5-y}Tb_zO_{12-\delta}$ (wherein $0.4<x\leq 1$, $0.4<y\leq 1$, $0.4<z\leq 1$, and $0<\delta$), $Li_{4\pm x}Ti_{5-y}Dy_zO_{12-\delta}$ (wherein $0.4<x\leq 1$, $0.4<y\leq 1$, $0.4<z\leq 1$, and $0<\delta$), $Li_{4\pm x}Ti_{5-y}HO_zO_{12-\delta}$ (wherein $0.4<x\leq 1$, $0.4<y\leq 1$, $0.4<z\leq 1$, and $0<\delta$), $Li_{4\pm x}Ti_{5-y}Er_zO_{12-\delta}$ (wherein $0.4<x\leq 1$, $0.4<y\leq 1$, $0.4<z\leq 1$, and $0<\delta$), $Li_{4\pm x}Ti_{5-y}Tm_zO_{12-\delta}$ (wherein $0.4<x\leq 1$, $0.4<y\leq 1$, $0.4<z\leq 1$, and $0<\delta$), $Li_{4\pm x}Ti_{5-y}Yb_zO_{12-\delta}$ (wherein $0.4<x\leq 1$, $0.4<y\leq 1$, $0.4<z\leq 1$, and $0<\delta$), $Li_{4\pm x}Ti_{5-y}Lu_zO_{12-\delta}$ (wherein $0.4<x\leq 1$, $0.4<y\leq 1$, $0.4<z\leq 1$, and $0<\delta$), $Li_{4\pm x}Ti_{5-y}Zr_zO_{12-\delta}$ (wherein $0.4<x\leq 1$, $0.4<y\leq 1$, $0.4<z\leq 1$, and $0<\delta$), $Li_{4\pm x}Ti_{5-y}Hf_zO_{12-\delta}$ (wherein $0.4<x\leq 1$, $0.4<y\leq 1$, $0.4<z\leq 1$, and $0<\delta$), $Li_{4\pm x}Ti_{5-y}V_zO_{12-\delta}$ (wherein $0.4<x\leq 1$, $0.4<y\leq 1$, $0.4z\leq 1$, and $0<\delta$), $Li_{4\pm x}Ti_{5-y}Nb_zO_{12-\delta}$ (wherein $0.4<x\leq 1$, $0.4<y\leq 1$, $0.4<z\leq 1$, and $0<\delta$), $Li_{4\pm x}Ti_{5-y}Ta_zO_{12-\delta}$ (wherein $0.4<x\leq 1$, $0.4<y\leq 1$, $0.4<z\leq 1$, and $0<\delta$), $Li_{4\pm x}Ti_{5-y}Mo_zO_{12-\delta}$ (wherein $0.4<x\leq 1$, $0.4<y\leq 1$, $0.4<z\leq 1$, and $0<\delta$), $Li_{4\pm x}Ti_{5-y}W_zO_{12-\delta}$ (wherein $0.4<x\leq 1$, $0.4<y\leq 1$, $0.4<z\leq 1$, and $0<\delta$), $Li_{4\pm x}Ti_{5-y}Mn_zO_{12-\delta}$ (wherein $0.4<x\leq 1$, $0.4<y\leq 1$, $0.4<z\leq 1$, and $0<\delta$), $Li_{4\pm x}Ti_{5-y}Tc_zO_{12-\delta}$ (wherein $0.4<x\leq 1$, $0.4<y\leq 1$, $0.4<z\leq 1$, and $0<\delta$), $Li_{4\pm x}Ti_{5-y}Re_zO_{12-\delta}$ (wherein $0.4<x\leq 1$, $0.4<y\leq 1$, $0.4<z\leq 1$, and $0<\delta$), $Li_{4\pm x}Ti_{5-y}Fe_zO_{12-\delta}$ (wherein $0.4<x\leq 1$, $0.4<y\leq 1$, $0.4<z\leq 1$, and $0<\delta$), $Li_{4\pm x}Ti_{5-y}Ru_zO_{12-\delta}$ (wherein $0.4<x\leq 1$, $0.4<y\leq 1$, $0.4<z\leq 1$, and $0<\delta$), $Li_{4\pm x}Ti_{5-y}Os_zO_{12-\delta}$ (wherein $0.4<x\leq 1$, $0.4<y\leq 1$, $0.4<z\leq 1$, and $0<\delta$), $Li_{4\pm x}Ti_{5-y}Co_zO_{12-\delta}$ (wherein $0.4<x\leq 1$, $0.4<y\leq 1$, $0.4<z\leq 1$, and $0<\delta$), $Li_{4\pm x}Ti_{5-y}Rh_zO_{12-\delta}$ (wherein $0.4<x\leq 1$, $0.4<y\leq 1$, $0.4<z\leq 1$, and $0<\delta$), $Li_{4\pm x}Ti_{5-y}Ir_zO_{12-\delta}$ (wherein $0.4<x\leq 1$, $0.4<y\leq 1$, $0.4<z\leq 1$, and $0<\delta$), $Li_{4\pm x}Ti_{5-y}Ni_zO_{12-\delta}$ (wherein $0.4<x\leq 1$, $0.4<y\leq 1$, $0.4<z\leq 1$, and $0<\delta$), $Li_{4\pm x}Ti_{5-y}Pd_zO_{12-\delta}$ (wherein $0.4<x\leq 1$, $0.4<y\leq 1$, $0.4<z\leq 1$, and $0<\delta$), $Li_{4\pm x}Ti_{5-y}Pt_zO_{12-\delta}$ (wherein $0.4<x\leq 1$, $0.4<y\leq 1$, $0.4<z\leq 1$, and $0<\delta$), $Li_{4\pm x}Ti_{5-y}Cu_zO_{12-\delta}$ (wherein $0.4<x\leq 1$, $0.4<y\leq 1$, $0.4<z\leq 1$, and $0<\delta$), $Li_{4\pm x}Ti_{5-y}Ag_zO_{12-\delta}$ (wherein $0.4<x\leq 1$, $0.4<y\leq 1$, $0.4<z\leq 1$, and $0<\delta$), $Li_{4\pm x}Ti_{5-y}Au_zO_{12-\delta}$ (wherein $0.4<x\leq 1$, $0.4<y\leq 1$, $0.4<z\leq 1$, and $0<\delta$), $Li_{4\pm x}Ti_{5-y}Zn_zO_{12-\delta}$ (wherein $0.4<x\leq 1$, $0.4<y\leq 1$, $0.4<z\leq 1$, and $0<\delta$), $Li_{4\pm x}Ti_{5-y}Cd_zO_{12-\delta}$ (wherein $0.4<x\leq 1$, $0.4<y\leq 1$, $0.4<z\leq 1$, and $0<\delta$), $Li_{4\pm x}Ti_{5-y}Hg_zO_{12-\delta}$ (wherein $0.4<x\leq 1$, $0.4<y\leq 1$, $0.4<z\leq 1$, and $0<\delta$), $Li_{4\pm x}Ti_{5-y}Al_zO_{12-\delta}$ (wherein $0.4<x\leq 1$, $0.4<y\leq 1$, $0.4<z\leq 1$, and $0<\delta$), $Li_{4\pm x}Ti_{5-y}Ga_zO_{12-\delta}$ (wherein $0.4<x\leq 1$, $0.4<y\leq 1$, $0.4<z\leq 1$, and $0<\delta$), $Li_{4\pm x}Ti_{5-y}In_zO_{12-\delta}$ (wherein $0.4<x\leq 1$, $0.4<y\leq 1$, $0.4<z\leq 1$, and $0<\delta$), $Li_{4\pm x}Ti_{5-y}Tl_zO_{12-\delta}$ (wherein $0.4<x\leq 1$, $0.4<y\leq 1$, $0.4<z\leq 1$, and $0<\delta$), $Li_{4\pm x}Ti_{5-y}Ge_zO_{12-\delta}$ (wherein $0.4<x\leq 1$, $0.4<y\leq 1$, $0.4<z\leq 1$, and $0<\delta$), $Li_{4\pm x}Ti_{5-y}Sn_zO_{12-\delta}$ (wherein $0.4<x\leq 1$, $0.4<y\leq 1$, $0.4<z\leq 1$, and $0<\delta$), $Li_{4\pm x}Ti_{5-y}Pb_zO_{12-\delta}$ (wherein $0.4<x\leq 1$, $0.4<y\leq 1$, $0.4<z\leq 1$, and $0<\delta$), $Li_{4\pm x}Ti_{5-y}Sb_zO_{12-\delta}$ (wherein $0.4<x\leq 1$, $0.4<y\leq 1$, $0.4<z\leq 1$, and $0<\delta$), $Li_{4\pm x}Ti_{5-y}Bi_zO_{12-\delta}$ (wherein $0.4<x\leq 1$, $0.4<y\leq 1$, $0.4<z\leq 1$, and $0<\delta$), $Li_{4\pm x}Ti_{5-y}Po_zO_{12-\delta}$ (wherein $0.4<x\leq 1$, $0.4<y\leq 1$, $0.4<z\leq 1$, and $0<\delta$), $Li_{4\pm x}Ti_{5-y}As_zO_{12-\delta}$ (wherein $0.4<x\leq 1$, $0.4<y\leq 1$, $0.4<z\leq 1$, and $0<\delta$), $Li_{4\pm x}Ti_{5-y}Se_zO_{12-\delta}$ (wherein $0.4<x\leq 1$, $0.4<y\leq 1$, $0.4<z\leq 1$, and $0<\delta$), or $Li_{4\pm x}Ti_{5-y}Te_zO_{12-\delta}$ (wherein $0.4<x\leq 1$, $0.4<y\leq 1$, $0.4<z\leq 1$, and $0<\delta$). In the above-described mixed conductors, for example, $0<\delta\leq 3$, $0<\delta\leq 2$, $0<\delta 1.5$, $0<\delta\leq 1$, $0<\delta\leq 0.5$, or $0<\delta\leq 0.3$.

For example, the mixed conductor may have an electronic conductivity which is greater than an ionic conductivity of the mixed conductor. The mixed conductor simultaneously provides both ionic conductivity and electronic conductivity, and the electronic conductivity may be greater than the ionic conductivity of the mixed conductor. The electronic conductivity of the mixed conductor may be, for example, 10 to $10^6$ times, 50 to $10^6$ times, $1\times 10^2$ to $10^6$ times, $5\times 10^2$ to $10^6$ times, or $1\times 10^3$ to $10^6$ times greater than an ionic conductivity of the mixed conductor at room temperature, e.g., at 25° C. Also, the electronic conductivity of the mixed conductor may be, for example, $1\times 10^3$ to $10^6$ times, $5\times 10^3$ to $10^6$ times, or $1\times 10^4$ to $10^6$ times greater than that of $Li_4Ti_5O_{12}$ at room temperature, e.g., at 25° C.

The electronic conductivity of the mixed conductor may be, for example, $1.0\times 10^{-6}$ S/cm to 1.0 S/cm, $5.0\times 10^{-6}$ S/cm to 1.0 S/cm, $1.0\times 10^{-5}$ S/cm to 1.0 S/cm, $5.0\times 10^{-5}$ S/cm to 1.0 S/cm, $1.0\times 10^{-4}$ S/cm to 1.0 S/cm, $5.0\times 10^{-4}$ S/cm to 1.0 S/cm, or $1.0\times 10^{-3}$ S/cm to $1.0\times 10^{-1}$ S/cm at room temperature, e.g., at 25° C. As the mixed conductor has such a high electronic conductivity, an electrochemical device including the mixed conductor may have a decreased internal resistance. The electronic conductivity may be determined by an eddy current method or a kelvin bridge method. The electrical conductivity can be determined according to ASTM B-193, "Standard Test Method for Resistivity of Electrical Conductor Materials," e.g., at 25° C., or according to ASTM E-1004, "Standard Test Method for Determining Electrical Conductivity Using the Electromagnetic (Eddy-Current) Method," e.g., at 25° C. Additional details may be determined by one of skill in the art without undue experimentation.

The ionic conductivity of the mixed conductor may be, for example, $1.0\times 10^{-7}$ S/cm or to $1.0\times 10^{-1}$ S/cm, $5.0\times 10^{-7}$ S/cm to $1.0\times 10^{-1}$ S/cm, $1.0\times 10^{-6}$ S/cm to $1.0\times 10^{-1}$ S/cm, $5.0\times 10^{-6}$ S/cm to $1.0\times 10^{-1}$ S/cm, or $1.0\times 10^{-5}$ S/cm to $1.0\times 10^{-2}$ S/cm at room temperature, e.g., at 25° C. The ionic conductivity of the mixed conductor may be, for example, $1.0\times 10^{-7}$ S/cm or to $10^{-4}$ S/cm, $5.0\times 10^{-7}$ S/cm to $10^{-4}$ S/cm, $1.0\times 10^{-6}$ S/cm to $10^{-4}$ S/cm, $5.0\times 10^{-6}$ S/cm to $10^{-4}$ S/cm, or $1.0\times 10^{-5}$ S/cm to $10^{-4}$ S/cm at room temperature, e.g., at 25° C. Because the mixed conductor has such a high ionic conductivity, an electrochemical device including the mixed conductor may have a decreased internal resistance. Ionic conductivity may be determined by a complex impedance method at 25° C., further details of which can be found in J.-M. Winand et al., "Measurement of Ionic Conductivity in Solid Electrolytes," Europhysics Letters, vol. 8, no. 5, p. 447-452, 1989.

The mixed conductor may include, for example, a phase having a spinel-type crystal structure. While not wanting to be bound by theory, it is understood that the spinel-type structure contributes to the improved electrochemical stability of the mixed conductor.

For example, in an X-ray diffraction (XRD) spectrum of the mixed conductor, a peak intensity ratio (Ia/Ib) of a peak intensity (Ia) corresponding to a crystal plane (111) at a diffraction angle 2θ of 18°±2.5° to a peak intensity (Ib) at a diffraction angle 2θ of 23.5°±2.5° may be 0.001 to 1, 0.001 to 0.9, 0.001 to 0.8, 0.001 to 0.7, 0.001 to 0.6, 0.001 to 0.5, or 0.001 to 0.4. While not wanting to be bound by theory, it is understood that when the mixed conductor has such a peak intensity ratio, the electronic conductivity and the ionic conductivity is improved.

The mixed conductor may have another phase different from a phase having a spinel-type crystal structure. For example, the mixed conductor may include a phase having a spinel-type crystal structure that belongs to a space group having cubic symmetry, e.g., having a cubic face-centered bravais lattice symmetry, e.g., an Fd-3m space group, i.e., space group 227, and in addition to the phase, the mixed conductor may include another phase, different from the phase having a spinel-type crystal structure, such as at least one of $Li_2TiO_3$, $Gd_2Ti_2O_7$, $GdTiO_3$, $LiNbO_3$, or $Nb_2O_5$. While not wanting to be bound by theory, it is understood that the improved electrical and ionic conductivity of the mixed conductor is because the mixed conductor has a polycrystalline structure including a plurality of different phases, e.g., phases having a different structure type, a different bravais lattice symmetry, a different composition, or a different space group.

A band gap between a valence band and a conduction band of the mixed conductor may be less than a band gap between a valence band and a conduction band of $Li_4Ti_5O_{12}$. For example, a band gap between a valence band of the mixed conductor and a conduction band of the mixed conductor may be 0.001 eV to 2.0 electron volts (eV), 0.001 eV to 1.8 eV, 0.001 eV to 1.6 eV, 0.001 eV to 1.4 eV, or 0.001 eV to 1.2 eV. Since the mixed conductor has such a low value of a band gap between a valence band and a conduction band, electron transfer from the valence band to the conduction band may be facilitated, thereby improving electronic conductivity of the mixed conductor.

In the mixed conductor, for example, Ti may have an oxidation number, e.g., oxidation state, or formal oxidation state, between 3 and 4. For example, because Ti in the mixed conductor has a mixed valence state with at least two different oxidation numbers, a new state density function may be observed near the Fermi energy (Ef), and the band gap between the valence band and the conduction band may be reduced. While not wanting to be bound by theory, it is understood that the mixed conductor comprises a state density function near the Fermi energy, and that this state density function contributes to the improved electronic conductivity of the mixed conductor.

In Formula 1, G in the mixed conductor may have, for example, an oxidation number different from an oxidation number of Ti. For example, due to the additional inclusion of G in Formula 1 having an oxidation number different from those of Ti in the mixed conductor, an additional new state density function may be observed near the Fermi energy (Ef), and the band gap between the valence band and the conduction band may be reduced. While not wanting to be bound by theory, it is understood that the improved electrical conductivity result from the reduced band gap.

The mixed conductor may provide further improved ionic conductivity through the inclusion of an oxygen vacancy. For example, due to the inclusion of an oxygen vacancy in the mixed conductor, the position of the state density function may be shifted closer to the Fermi energy (Ef), and the band gap between the valance band and the conduction band may be reduced. In conclusion, the mixed conductor may have further improved electronic conductivity. While not wanting to be bound by theory, it is understood the disclosed mixed conductor comprises a band gap between the valance band and the conduction band which is less than a band gap of a material having a same content of A, Ti, and G and without an oxygen vacancy.

Figure 3:
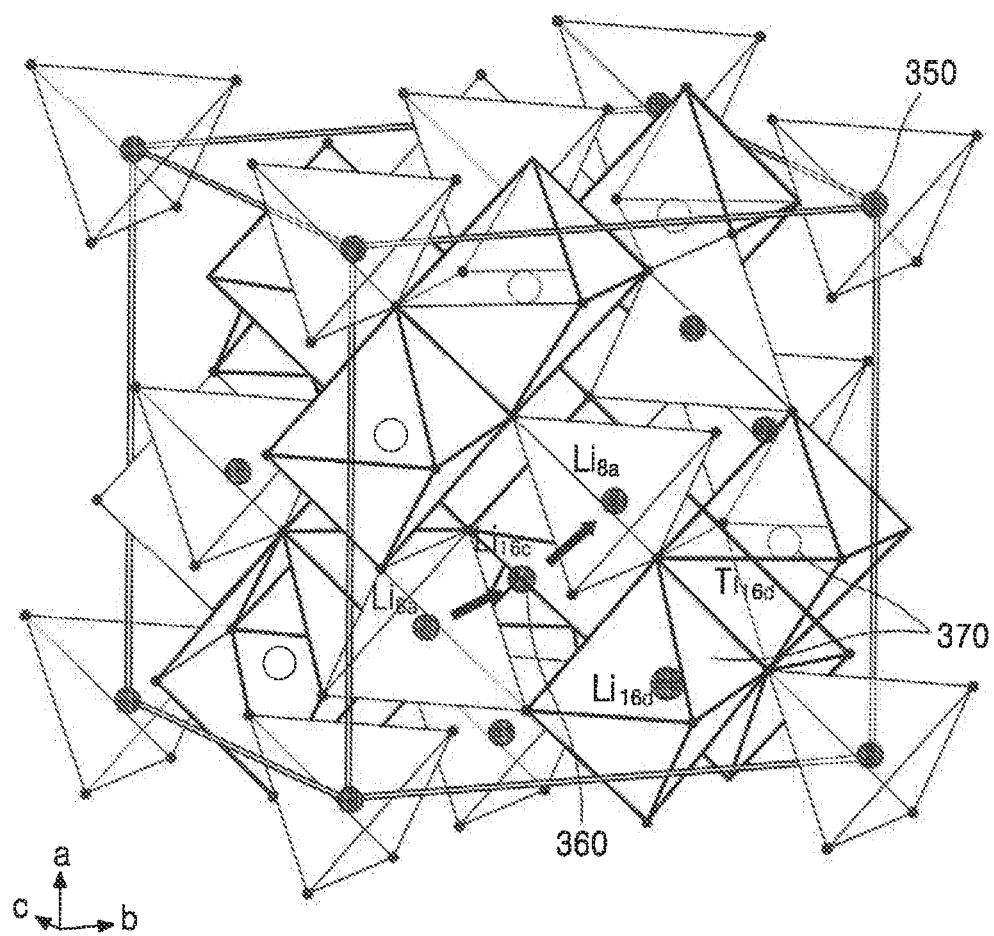
FIG. 3 is a schematic view illustrating a spinel-type crystal structure of $Li_4Ti_5O_{12}$.

In the mixed conductor, for example, referring to FIG. 3, A may be situated on at least one of a tetrahedral 8a site 350, an octahedral 16c site 360, and partially an octahedral 16d site 370 in the spinel-type crystal structure. Referring to FIG. 3, when A is lithium, an activation energy (Ea, 8a→16c→8a) for a lithium transition from the tetrahedral 8a site to another tetrahedral 8a site via the octahedral 16c site of the mixed conductor is less than an activation energy (Ea, 8a→16c→8a) for a lithium transition of $Li_4Ti_5O_{12}$. Because the mixed conductor has an activation energy upon lithium transition which is less than that of $Li_4Ti_5O_{12}$, transfer and/or diffusion of lithium ions may be facilitated in the mixed conductor. The reduced activation energy in the mixed conductor is understood to result in an ionic conductivity which is greater than an ionic conductivity of $Li_4Ti_5O_{12}$.

An electrode comprises the mixed conductor.

An electrochemical device according to an embodiment may include the mixed conductor. The electrochemical device may comprise a positive electrode; a negative electrode comprising the electrode; the mixed conductor, and a separator between the positive electrode and the negative electrode. As the electrochemical device includes the mixed conductor, which provides improved chemical stability and transfers ions and electrons simultaneously, deterioration of the electrochemical device may be prevented.

For example, the electrochemical device may be at least one of a battery, an accumulator, a supercapacitor, a fuel cell, a sensor, and an electrochromic device. However, embodiments are not limited thereto. Any suitable electrochemical device available in the art may be used.

The battery may be, for example, a primary battery or a secondary battery. The battery may be, for example, a lithium battery, a sodium battery, or the like. However, embodiments are not limited thereto. Any suitable battery available in the art may be used. The lithium battery may be, for example, a lithium-ion battery, a lithium-air battery, or the like. However, embodiments are not limited thereto. Any suitable lithium battery available in the art may be used. Examples of an electrochromic device include an electrochemical mirror, a window, a screen, a facade, and the like. However, embodiments are not limited thereto. Any suitable electrochromic device available in the art may be used.

The electrochemical device including the mixed conductor may be, for example, a lithium-air battery.

The lithium air battery may include a positive electrode. The positive electrode may be an air electrode. In an aspect the positive electrode may be on a positive electrode current collector.

The positive electrode may include a conductive material. The conductive material may be, for example, porous. Because the conductive material is porous, permeation of air into the conductive material may be facilitated. The conductive material may be a material that is porous and/or electrically conductive. Any suitable conductive material available in the art may be used. For example, the conductive material may be a porous carbonaceous material. Examples of the carbonaceous material may include a carbon black, graphite, graphene, activated carbon, carbon fiber, and the like. Any suitable carbonaceous material available in the art may be used. The conductive material may be, for example, a metallic material. The metallic material may be, for example, a metal fiber, metal mesh, metal powder, or the like. The metal powder may be, for example, copper, silver, nickel, aluminum, or the like. The conductive material may be, for example, an electrically conductive organic material. Examples of the electrically conductive organic material include a polyphenylene derivative or a polythiophene derivative. The conductive material may be used, for example, alone or in combination. The cathode may include a mixed conductor as the conductive material. The cathode may further include any of the above-listed conductive materials, in addition to the mixed conductor.

The cathode may further include, for example, a catalyst for oxidation/reduction of oxygen. The catalyst may be, for example, a metal-based catalyst such as platinum, gold, silver, palladium, ruthenium, rhodium, and osmium; an oxide-based catalyst such as manganese oxide, iron oxide, cobalt oxide, and nickel oxide; or an organometallic catalyst such as cobalt phthalocyanine. However, embodiments are not limited thereto. Any suitable catalyst for oxidation/reduction of oxygen available in the art may be used.

For example, the catalyst may be supported on a catalyst support. The catalyst support may be, for example, an oxide catalyst support, a zeolite catalyst support, a clay-based mineral catalyst support, a carbon catalyst support, or the like. The oxide catalyst support may be, for example, a metal oxide catalyst support including at least one metal of Al, Si, Zr, Ti, Ce, Pr, Sm, Eu, Tb, Tm, Yb, Sb, Bi, V, Cr, Mn, Fe, Co, Ni, Cu, Nb, Mo, or W. The oxide catalyst support may include, for example, alumina, silica, zirconium oxide, titanium dioxide, or the like. The carbon catalyst support may be a carbon black such as Ketjen black, acetylene black, channel black, or lamp black; graphite such as natural graphite, artificial black, or expandable graphite; activated carbon; and carbon fiber. However, embodiments are not limited thereto. Any suitable catalyst support available in the art may be used.

For example, the cathode may further include a binder. The binder may include, for example, a thermoplastic resin or a thermocurable resin. Non-limiting examples of the binder include polyethylene, polypropylene, polytetrafluoro ethylene (PTFE), polyvinylidene fluoride (PVdF), styrene-butadiene rubber, tetrafluoroethylene-perfluoro alkyl vinyl ether copolymer, fluorovinylidene-hexafluoropropylene copolymer, fluorovinylidene-chlorotrifluoroethylene copolymer, ethylene-tetrafluoroethylene copolymer, polychloro-trifluoroethylene, fluorovinylidene-pentafluoro propylene copolymer, propylene-tetrafluoroethylene copolymer, ethylene-chlorotrifluoroethylene copolymer, fluorovinylidene-hexafluoropropylene-tetrafluoroethylene copolymer, fluoro-vinylidene-perfluoromethyl vinyl ether-tetrafluoro ethylene copolymer, or an ethylene-acrylic acid copolymer, which may be used alone or in any suitable combination. Any suitable binder available in the art may be used.

For example, the cathode may be manufactured by mixing a conductive material, a catalyst for oxidation/reduction of oxygen, and a binder together, and adding a solvent to the resulting mixture to prepare a cathode slurry, coating the cathode slurry on a surface of a base, drying the coated cathode slurry, and press-molding the cathode slurry against the base to improve a density of the electrode. The base may be, for example, a cathode current collector, a separator, or a solid electrolyte membrane. The cathode current collector may be, for example, a gas diffusion layer. The conductive material may include a mixed conductor. The catalyst for oxidation/reduction of oxygen and the binder may be omitted depending on a type of the cathode.

The lithium-air battery includes a negative electrode. The negative electrode may include lithium.

The negative electrode may be, for example, a lithium metal thin film or a lithium metal-based alloy thin film. For example, the lithium metal-based alloy may be an alloy of lithium with, for example, aluminum, tin, magnesium, indium, calcium, titanium, or vanadium.

The lithium-air battery may include an electrolyte membrane between the cathode and the negative electrode.

The electrolyte membrane may include at least one electrolyte of a liquid electrolyte, a gel electrolyte, and a solid electrolyte. The liquid electrolyte, the gel electrolyte, and the solid electrolyte are not particularly limited, and may be any suitable electrolyte available in the art.

The solid electrolyte may include at least one of a solid electrolyte including an ionically conductive inorganic material, a solid electrolyte including a polymeric ionic liquid (PIL) and a lithium salt, a solid electrolyte including an ionically conductive polymer and a lithium salt. However, embodiments are not limited thereto. Any suitable material available as a solid electrolyte in the art may be used.

The ionically conductive inorganic material may include at least one of a glass or amorphous metal ionic conductor, a ceramic active metal ionic conductor, and a glass-ceramic active metal ionic conductor. However, embodiments are not limited thereto. Any suitable ionically conductive inorganic material available in the art may be used. The ionically conductive inorganic material may be, for example, a molded product of ionically conductive inorganic particles or sheet.

For example, the ionically conductive inorganic material may be at least one of $BaTiO_3$, $Pb(Zr_{1-a}Ti_a)O_3$ wherein $0 \leq a \leq 1$ ("PZT"), $Pb_{1-x}La_xZr_{1-y}Ti_yO_3$ ("PLZT") (wherein $0 \leq x<1$ and $0 \leq y<1$), $Pb(Mg_3Nb_{2/3})O_3$—$PbTiO_3$ ("PMN-PT"), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $SiC$, lithium phosphate ($Li_3PO_4$), lithium titanium phosphate ($Li_xTi_y(PO_4)_3$, wherein $0<x<2$, and $0<y<3$), lithium aluminum titanium phosphate ($Li_xAl_yTi_z(PO_4)_3$, wherein $0<x<2$, $0<y<1$, and $0<z<3$), $Li_{1+x+y}(Al_aGa_{1-a})_x(Ti_bGe_{1-b})_{2-x}Si_yP_{3-y}O_{12}$ (wherein $0 \leq a \leq 1$, $0 \leq b \leq 1$, $0 \leq x \leq 1$, and $0 \leq y \leq 1$), lithium lanthanum titanate ($Li_xLa_yTiO_3$, wherein $0<x<2$ and $0<y<3$), lithium germanium thiophosphate ($Li_xGe_yP_zS_w$, wherein $0<x<4$, $0<y<1$, $0<z<1$, and $0<w<5$), lithium nitrate ($Li_xN_y$, wherein $0<x<4$ and $0<y<2$), $SiS_2$ type glass ($Li_xSi_yS_z$, wherein $0<x<3$, $0<y<2$, and $0<z<4$), $P_2S_5$ type glass ($Li_xP_yS_z$, wherein $0<x<3$, $0<y<3$, and $0<z<7$), $Li_2O$, LiF, LiOH, $Li_2CO_3$, $LiAlO_2$, $Li_2O$—$Al_2O_3$—$SiO_2$—$P_2O_5$—$TiO_2$—$GeO_2$-based ceramic, garnet-based ceramic, $Li_{3+x}La_3M_2O_{12}$ (wherein M=Te, Nb, or Zr) or a combination thereof.

The polymeric ionic liquid (PIL) may include, for example, a repeating unit including: i) at least one cation of an ammonium-based cation, a pyrrolidinium-based cation, a pyridinium-based cation, pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, or a triazole-based cation; and ii) at least one anion of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $BF_4^-$, $SO_4^-$, $CF_3SO_3^-$, $CF_3CO_2^-$, $(C_2F_5SO_2)_2N^-$, $(C_2F_5SO_2)(CF_3SO_2)N^-$, $NO_3^-$, $Al_2Cl_7^-$, $CF_3COO^-$, $CH_3COO^-$, $CF_3SO_3^-$, $(CF_3SO_2)_3C^-$, $(CF_3CF_2SO_2)_2N^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or $(CF_3SO_2)_2N$—. For example, the PIL may be poly(diallyldimethylammonium) (TFSI), poly(1-allyl-3-methylimidazolium trifluoromethanesulfonylimide), or poly((N-methyl-N-propylpiperidinium bis(trifluoromethanesulfonyl)imide)).

The ionically conductive polymer may include, for example, at least one ion conductive repeating unit derived from an ether-based monomer, an acryl-based monomer, a methacryl-based monomer, or a siloxane-based monomer.

The ionically conductive polymer may include for example, polyethylene oxide (PEO), polyvinyl alcohol (PVA), polyvinylpyrrolidone (PVP), polysulfone, polypropylene oxide (PPO), polymethylmethacrylate, polyethylmethacrylate, polydimethylsiloxane, polyacrylic acid, polymethacrylic acid, polymethyl acrylate, polyethylacrylate, poly 2-ethylhexyl acrylate, polybutyl methacrylate, poly 2-ethylhexyl methacrylate, polydesyl acrylate, polyethylene vinyl acetate, a phosphate ester polymer, polyester sulfide, polyvinylidene fluoride (PVdF), a Li-substituted Nafion, and the like. However, embodiments are not limited thereto. Any suitable material available as an ionically conductive polymer in the art may be used.

The electronically conductive polymer may be, for example, a polyphenylene derivative, a polythiophene derivative, or the like. However, embodiments are not limited thereto. Any suitable electronically conductive polymer available in the art may be used.

For example, the gel electrolyte may be obtained by adding a low-molecular weight solvent to the solid electrolyte between the cathode and the negative electrode. For example, the gel electrolyte may be obtained by adding a solvent, such as a low-molecular weight organic compound, an oligomer, and the like, into a polymer. For example, the gel electrolyte may be obtained by adding a solvent, such as a low-molecular weight organic compound, an oligomer, and the like, into the polymer electrolyte described above.

For example, the liquid electrolyte may include a solvent and a lithium salt.

The solvent may include at least one of an organic solvent, an ionic liquid, and an oligomer. However, embodiments are not limited thereto. Any suitable solvent in a liquid form at room temperature (e.g., 25° C.) and available in the art may be used.

The organic solvent may include, for example, at least one of an ether-based solvent, a carbonate-based solvent, an ester-based solvent, or a ketone-based solvent. For example, the organic solvent may include at least one of propylene carbonate, ethylene carbonate, fluoroethylene carbonate, vinylethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxorane, dimethyl acetamide, dimethylsulfoxide, dioxane, 1,2-dimethoxyethane, sulfolane, dichloroethane, chlorobenzene, nitrobenzene, succinonitrile, diethylene glycol dimethyl ether (DEGDME), tetraethylene glycol dimethyl ether (TEGDME), polyethylene glycol dimethyl ether (PEGDME, Mn=about 500 Daltons), dimethyl ether, diethyl ether, dibutyl ether, dimethoxyethane, 2-methyltetrahydrofuran, or tetrahydrofuran. However, embodiments are not limited thereto. Any suitable organic solvent that is in liquid form available in the art at room temperature may be used.

The ionic liquid (IL) may include, for example, i) at least one cation of an ammonium-based cation, a pyrrolidinium-based cation, a pyridinium-based cation, pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, a triazole-based cation, and a mixture thereof; and ii) at least one anion of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $SO_4^-$, $CF_3SO_3^-$, $CF_3CO_2^-$, $(C_2F_5SO_2)_2N^-$, $(C_2F_5SO_2)(CF_3SO_2)N^-$, $NO_3^-$, $Al_2Cl_7^-$, $CF_3COO^-$, $CH_3COO^-$, $CF_3SO_3^-$, $(CF_3SO_2)_3C^-$, $(CF_3CF_2SO_2)_2N^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or $(CF_3SO_2)_2N^-$.

The lithium salt may include, for example, at least one of lithium bis(trifluoromethanesulfonyl)imide (LiTFSI), $LiPF_6$, $LiBF_4$, $LiAsF_6$, $LiClO_4$, $LiNO_3^-$, (lithium bis(oxalato) borate (LiBOB), $LiCF_3SO_3$, $LiN(SO_2CF_3)_2$, $LiN(SO_2C_2F_5)_2$, $LiC(SO_2CF_3)_3$, $Li\ N(SO_3CF_3)_2$, $LiC_4F_9SO_3$, $LiAlCl_4$, or lithium trifluoromethanesulfonate (LiTfO). However, embodiments are not limited in the art. Any suitable material available as lithium salt in the art may be used. A concentration of the lithium salt may be, for example, 0.01 M to 5.0 M.

In an embodiment, the lithium-air battery may further include, for example, a separator between the positive electrode and the negative electrode. The separator may be any suitable separator having a composition having suitable durability under usage environments of a lithium-air battery. For example, the separator may be a polymeric non-woven fabric such as polypropylene non-woven fabric or polyphenylene sulfide non-woven fabric; a porous film of an olefin-based resin such as polyethylene or polypropylene; glass fiber; or a combination of at least two of these materials.

For example, the electrolyte membrane may have a structure including a separator impregnated with a solid polymer electrolyte or a liquid electrolyte. The electrolyte membrane including a separator impregnated with a solid polymer electrolyte may be prepared by arranging a solid polymer electrolyte film(s) on one or both surfaces of the separator while performing roll-pressing thereon at the same time. In some embodiments, the electrolyte membrane including a separator impregnated with a liquid electrolyte may be prepared by injecting the liquid electrolyte including a lithium salt into the separator.

After the negative electrode is mounted on an inner side of a case, the electrolyte membrane may be arranged on the negative electrode, followed by arranging the positive electrode on the electrolyte membrane, arranging a porous positive electrode current collector on the positive electrode, and arranging a pressing member that allows transfer of air into the air electrode, i.e., positive electrode, and pushing the porous positive electrode current collector with the pressing member to fix the cell, thereby completing the manufacture of the lithium air battery. The case may be divided into upper and lower parts that contact the negative electrode and the air electrode, respectively. An insulating resin may be between the upper and lower parts to electrically insulate the positive electrode and the negative electrode from each other.

In an embodiment, the lithium-air battery may be used as a lithium primary battery or a lithium secondary battery. The lithium air battery may have any of various shapes, not limited to a specific shape, for example, a shape like a coin, a button, a sheet, a stack, a cylinder, a plane, or a horn. The lithium air battery may be used in a battery for an electric vehicle.

Figure 4:
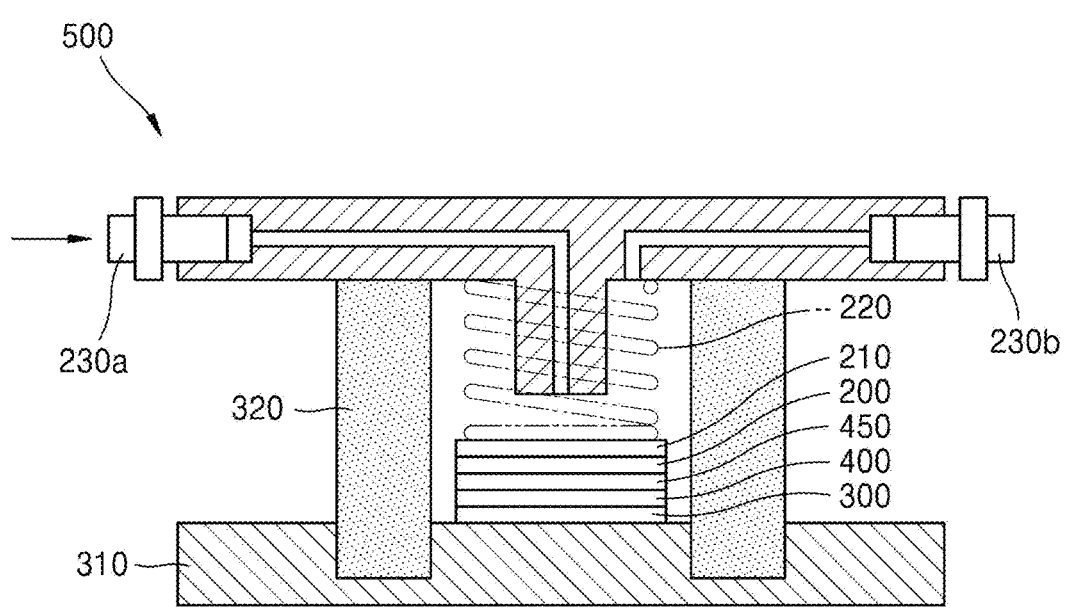
FIG. 4 is a schematic view illustrating an embodiment of a lithium air battery.

FIG. 4 is a schematic view of a lithium air battery 500 according to an embodiment. Referring to FIG. 4, the lithium air battery 500 may include a positive electrode 200 adjacent to a first current collector 210 and using oxygen as an active material, a negative electrode 300 adjacent to a second current collector 310 and including lithium, and a first electrolyte membrane 400 between the positive electrode 200 and the negative electrode 300. The first electrolyte membrane 400 may be a separator impregnated with a liquid electrolyte. A second electrolyte membrane 450 may be between the positive electrode 200 and the first electrolyte membrane 400. The second electrolyte membrane 450 may be a lithium ion conductive solid electrolyte membrane. The first current collector 210, which is porous, may serve as a gas diffusion layer. Also, a pressing member 220 that allows air to reach the positive electrode 200 may be on the first current collector 210. A case 320 formed of an insulating resin between the positive electrode 200 and the negative electrode 300 may electrically insulate the positive electrode 200 and the negative electrode 300 from each other. Air may be supplied through an air inlet 230a and be discharged through an air outlet 230b. The lithium-air battery 500 may be accommodated in a stainless steel (SUS) container.

The term "air" regarding a lithium-air battery, as used herein is not limited to atmospheric air, and may refer to a combination of gases including oxygen, or pure oxygen gas. This broad definition of "air" also applies to other terms including "air battery" and "air electrode."

A method of preparing a mixed conductor according to an embodiment comprises: mixing an element A precursor, a titanium precursor, and an element G precursor to prepare a mixture; and heat-treating the mixture to prepare the mixed conductor. By manufacturing a mixed conductor using a solid phase method, mass-production of the mixed conductor may be simplified.

The preparing of the mixture may be, for example, performed by ball milling the element A precursor, the titanium precursor, and the element G precursor in an organic solvent and/or an aqueous solution. The organic solvent may comprise an alcohol, such as 2-propanol, and may comprise any suitable solvent available in the art. The heat treatment may be in the absence of a solvent.

The prepared mixed conductor may be, for example, represented by Formula 1:

$$A_{4\pm x}Ti_{5-y}G_zO_{12-\delta}$$ Formula 1 wherein, in Formula 1, A is a monovalent cation, G is at least one of a monovalent cation, a divalent cation, a trivalent cation, a tetravalent cation, a pentavalent cation, or a hexavalent cation, with the proviso that G is not Ti or Cr, and wherein $0<x<2$, $0.3<y<5$, $0<z<5$, and $0<\delta\leq3$. $\delta$ represents a content of an oxygen vacancy.

For example, the element A precursor may be a salt of A or an oxide of A. For example, the titanium precursor may be a titanium salt or a titanium oxide. For example, the element G precursor may be a salt of G or an oxide of G.

The element A precursor may be, for example, a lithium precursor. The lithium precursor may be, for example, $Li_2CO_3$, $LiNO_3$, $LiNO_2$, LiOH, a hydrate of lithium hydroxide such as $LiOH.H_2O$, LiH, LiF, LiCl, LiBr, LiI, $CH_3OOLi$, $Li_2O$, $Li_2SO_4$, lithium dicarboxylate, lithium citrate, lithium fatty acid, or an alkyl lithium compound, such as butyl lithium. However, embodiments are not limited thereto. Any suitable lithium precursor available in the art may be used.

The Ti precursor may be, for example, $TiO_2$, $TiCl_4$, $Ti(SO_4)_2$, $Ti_2O_3$, or TiO. However, embodiments are not limited thereto. Any suitable titanium precursor available in the art may be used.

The element G precursor may be, for example, a metal precursor that comprises at least one of Mg, Ca, Sr, Sc, Y, La, Ce, Pr, Nd, Sm, Eu, Gd, Tb, Dy, Ho, Er, Tm, Yb, Lu, Zr, Hf, V, Nb, Ta, Mo, W, Mn, Tc, Re, Fe, Ru, Os, Co, Rh, Ir, Ni, Pd, Pt, Cu, Ag, Au, Zn, Cd, Hg, Al, Ga, In, Tl, Ge, Sn, Pb, Sb, Bi, Po, As, Se, or Te. For example, the element G precursor may be a Nb precursor, a Ta precursor, a Gd precursor, or an In precursor. The Nb precursor may be, for example, $NbO_2$, $Nb_2O_5$, $NbF_4$, $NbF_5$, $Nb(OCH_2CH_3)_5$, or $NbCl_5$. However, embodiments are not limited thereto. Any suitable Nb precursor available in the art may be used. The Ta precursor may be, for example, $Ta_2O_5$, $TaF_5$, or $Ta(OCH_2CH_2CH_2CH_3)_5$. However, embodiments are not limited thereto. Any suitable Ta precursor available in the art may be used. The Gd precursor may be, for example, $GdCl_3$, $GdF_3$, $Gd(NO_3)_3$, $Gd(SO_4)_3$, or $Gd_2O_3$. However, embodiments are not limited thereto. Any suitable Gd precursor available in the art may be used. The In precursor may be, for example, $InCl_2$, InCl, $InF_3$, $In(NO_3)_3$, $In(SO_4)_3$, $In_2O_3$, or $InCl_3$. However, embodiments are not limited thereto. Any suitable In precursor available in the art may be used.

In the method of preparing a mixed conductor, the preparing of the mixed conductor by reacting the mixture in a solid phase may include: drying the mixture; and performing a primary heat treatment on the mixture under an oxidative atmosphere to prepare a; pulverizing the primary heat-treatment product, pressing the pulverized primary heat treatment product to prepare a pellet; and performing a secondary heat treatment on the pellet under a) a reductive atmosphere, b) an oxidative atmosphere, or c) an oxidative atmosphere and a reductive atmosphere.

In the secondary heat treatment, a) the reductive atmosphere, b) the oxidative atmosphere, or c) the oxidative atmosphere and the reductive atmosphere may be independently selected, depending on the oxidation number of the metal included in the desired mixed conductor.

The reductive atmosphere may be an atmosphere including a reductive gas. Examples of the reductive gas include hydrogen ($H_2$). However, embodiments are not limited thereto. Any suitable reductive gas available in the art may be used. The reductive atmosphere may be a mixture of a reductive gas and an inert gas. Examples of the inert gas include nitrogen and argon. However, embodiments are not limited thereto. Any suitable inert gas available in the art may be used. In the reductive atmosphere, an amount of the reductive gas may be, for example, about 1 volume percent (vol %) to about 99 vol %, about 2 vol % to about 50 vol %, or about 5 vol % to about 20 vol %. When the heat treatment is performed under a reductive atmosphere, the mixed conductor may be introduced with oxygen vacancy.

The oxidative atmosphere may be an atmosphere including an oxidative gas. Examples of the oxidative gas include oxygen or air. However, embodiments are not limited thereto. Any suitable oxidative gas available in the art may be used. The oxidative atmosphere may be a mixture of an oxidative gas and an inert gas. The inert gas may be at least one of nitrogen, argon, or helium, and may be identical to the inert gas that is used in the reductive atmosphere.

The secondary heat treatment under an oxidative atmosphere and a reductive atmosphere may be performed by a heat treatment under an oxidative atmosphere and then a heat treatment under a reductive atmosphere. The oxidative atmosphere and the reductive atmosphere may each be identical to the oxidative atmosphere and the reductive atmosphere, respectively.

The primary heat treatment may be performed, for example, at a temperature in a range of about 600° C. to about 1,000° C., about 700° C. to about 900° C., about 600° C. to about 800° C., or about 750° C. to about 850° C. The primary heat treatment may be performed for about 2 hours to about 10 hours, about 3 hours to about 9 hours, about 4 hours to about 8 hours, or about 4 hours to about 6 hours. The secondary heat treatment may be performed, for example, at a temperature in a range of about 700° C. to about 1,400° C., about 800° C. to about 1300° C., about 900° C. to about 1200° C., or about 900° C. to about 1100° C. The secondary heat treatment may be performed for about 6 hours to about 48 hours, about 10 hours to about 40 hours, about 15 hours to about 35 hours, or about 20 hours to about 30 hours. As the primary and secondary heat treatments are performed under such conditions, the prepared mixed conductor may have further improved electrochemical stability.

Hereinafter example embodiments will be described in detail with reference to Examples and Comparative Examples. These examples are provided for illustrative purposes only and are not intended to limit the scope of the present inventive concept.

EXAMPLES

Preparation of Mixed Conductor

Example 1: $Li_{4.5}Ti_{4.5}Nb_{0.5}O_{12-\delta}$ $Li_2CO_3$ as a lithium precursor, $TiO_2$ as a titanium precursor, and $Nb_2O_5$ as a niobium precursor, were mixed together at a stoichiometric ratio, followed by mixing with ethanol. The mixture was pulverized and mixed using a ball mill including zirconia balls at 280 revolutions per minute (rpm) for 4 hours, thereby obtaining a mixture. The obtained mixture was dried at a temperature of 90° C. for 6 hours, and then subjected to a primary heat treatment at a temperature of 700° C. under an air atmosphere for 5 hours. The product of the primary heat treatment was pulverized using a ball mill and pressed at an isostatic pressure to prepare pellets. The prepared pellets were subjected to a secondary heat treatment at a temperature of 950° C. under a reductive atmosphere for 24 hours, thereby preparing a mixed conductor. The reductive atmosphere included 5% hydrogen and 95% argon. The prepared mixed conductor had a composition of $Li_{4.5}Ti_{4.5}Nb_{0.5}O_{12-\delta}$ (wherein $0<\delta\leq3$).

Example 2: $Li_{3.5}Ti_{4.0}Nb_{1.0}O_{12-\delta}$

A mixed conductor was prepared in substantially the same manner as in Example 1, except that a stoichiometric ratio of the lithium precursor, the titanium precursor, and the niobium precursor was changed to correspond to $Li_{3.5}Ti_{4.0}Nb_{1.0}O_{12-\delta}$.

The prepared mixed conductor had a composition of $Li_{3.5}Ti_{4.0}Nb_{1.0}O_{12-\delta}$ (wherein $0<\delta\leq3$).

Example 3: $Li_{3.5}Ti_{4.0}Ta_{1.0}O_{12-\delta}$

A mixed conductor was prepared in substantially the same manner as in Example 1, except that a tantalum precursor, $Ta_2O_5$, was used instead of the niobium precursor, and a stoichiometric ratio of the lithium precursor, the titanium precursor, and the tantalum precursor was changed to correspond to $Li_{3.5}Ti_{4.0}Ta_{1.0}O_{12-\delta}$.

The prepared mixed conductor had a composition of $Li_{3.5}Ti_{4.0}Ta_{1.0}O_{12-\delta}$ (wherein $0<\delta\leq3$).

Example 4: $Li_{4.5}Ti_{4.5}Gd_{0.5}O_{12-\delta}$

A mixed conductor was prepared in substantially the same manner as in Example 1, except that a gadolinium precursor, $Gd_2O_3$, was used instead of the niobium precursor.

The prepared mixed conductor had a composition of $Li_{4.5}Ti_{4.5}Gd_{0.5}O_{12-\delta}$ (wherein $0<\delta\leq3$).

Example 5: $Li_{5.0}Ti_{4.0}Gd_{1.0}O_{12-\delta}$

A mixed conductor was prepared in substantially the same manner as in Example 1, except that a gadolinium precursor, $Gd_2O_3$, was used instead of the niobium precursor, and a stoichiometric ratio of the lithium precursor, the titanium precursor, and the gadolinium precursor was changed to correspond to $Li_{5.0}Ti_{4.0}Gd_{1.0}O_{12-\delta}$.

The prepared mixed conductor had a composition of $Li_{5.0}T_{4.0}Gd_{1.0}O_{12-\delta}$ (wherein $0<\delta\leq3$).

Example 6: $Li_{4.5}Ti_{4.5}In_{0.5}O_{12-\delta}$

A mixed conductor was prepared in substantially the same manner as in Example 1, except that an indium precursor, $In_2O_3$, was used instead of the niobium precursor.

The prepared mixed conductor had a composition of $Li_{4.5}Ti_{4.5}In_{0.5}O_{12-\delta}$ (wherein $0<\delta\leq3$).

Example 7: $Li_{5.0}Ti_{4.0}In_{1.0}O_{12-\delta}$

A mixed conductor was prepared in substantially the same manner as in Example 1, except that an indium precursor, $In_2O_3$, was used instead of a niobium precursor, and a stoichiometric ratio of the lithium precursor, the titanium precursor, and the gadolinium precursor was changed to correspond to $Li_{5.0}Ti_{4.0}In_{1.0}O_{12-\delta}$.

The prepared mixed conductor had a composition of $Li_{5.0}Ti_{4.0}In_{1.0}O_{12-\delta}$ (wherein $0<\delta\leq3$).

Example 8: $Li_{5.0}Ti_{4.0}Mn_{1.0}O_{12-\delta}$

A mixed conductor was prepared in substantially the same manner as in Example 1, except that a manganese precursor, $Mn_2O_3$, was used instead of the niobium precursor, and a stoichiometric ratio of the lithium precursor, the titanium precursor, and the manganese precursor was changed to correspond to $Li_{5.0}Ti_{4.0}Mn_{1.0}O_{12-\delta}$.

The prepared mixed conductor had a composition of $Li_{5.0}Ti_{4.0}Mn_{1.0}O_{12-\delta}$ (wherein $0<\delta\leq3$).

Example 9: $Li_{5.0}Ti_{4.0}Co_{1.0}O_{12-\delta}$

A mixed conductor was prepared in substantially the same manner as in Example 1, except that a cobalt precursor, $Co_2O_3$, was used instead of the niobium precursor, and a stoichiometric ratio of the lithium precursor, the titanium precursor, and the cobalt precursor was changed to correspond to $Li_{5.0}Ti_{4.0}Co_{1.0}O_{12-\delta}$.

The prepared mixed conductor had a composition of $Li_{5.0}Ti_{4.0}Co_{1.0}O_{12-\delta}$ (wherein $0<\delta\leq3$).

Example 10: $Li_{5.0}Ti_{4.5}Cu_{0.5}O_{12-\delta}$

A mixed conductor was prepared in substantially the same manner as in Example 1, except that a copper precursor, CuO, was used instead of the niobium precursor, and a stoichiometric ratio of the lithium precursor, the titanium precursor, and the copper precursor was changed to correspond to $Li_{5.0}Ti_{4.5}Cu_{0.5}O_{12-\delta}$.

The prepared mixed conductor had a composition of $Li_{5.0}Ti_{4.5}Cu_{0.5}O_{12-\delta}$ (wherein $0<\delta\leq3$).

Example 11: $Li_{5.0}Ti_{4.0}Sb_{1.0}O_{12-\delta}$

A mixed conductor was prepared in substantially the same manner as in Example 1, except that an antimony precursor, $Sb_2O_3$, was used instead of the niobium precursor, and a stoichiometric ratio of the lithium precursor, the titanium precursor, and the antimony precursor was changed to correspond to $Li_{5.0}Ti_{4.0}Sb_{1.0}O_{12-\delta}$.

The prepared mixed conductor had a composition of $Li_{5.0}Ti_{4.0}Sn_{1.0}O_{12-\delta}$ (wherein $0<\delta\leq3$).

Comparative Example 1: $Li_4Ti_5O_{12}$

Commercially available $Li_4Ti_5O_{12}$ powder was pressed at an isostatic pressure to prepare pellets as in Example 1.

Evaluation Example 1: Evaluation of Electronic Conductivity

The pellets of the mixed conductors prepared in Examples 1 to 11 and Comparative Example 1 were subjected to sputtering with gold to thereby complete an ion blocking cell.

The electronic conductivity thereof was measured by using a direct current DC polarization method at room temperature, e.g., at 25° C. A time-dependent current was measured, which was obtained while applying a constant voltage of 100 millivolts (mV) to the complete symmetric cell for 30 minutes. An electronic resistance of the mixed conductor was calculated from the measured current, and electronic conductivity was calculated from the electronic resistance. The partial results of measured electronic conductivity are shown in Table 1.

Evaluation Example 2: Evaluation of Ionic Conductivity

Separator layers, each impregnated with a liquid electrolyte (1 molar (M) LiTFSI in propylene carbonate (PC)), are disposed on both sides of the pellets of the mixed conductors to form an electrolyte membrane in Examples 1 to 11 and Comparative Example 1, and SUS current collectors are disposed on the electrolyte membranes, thereby completing the manufacture of an electron blocking cell. The ionic conductivity thereof was measured using a direct current DC polarization method at room temperature, e.g., at 25° C.

A time-dependent current was measured, which was obtained while applying a constant voltage of 100 mV to the complete symmetric cell for 30 minutes. An ion resistance of the cell was calculated from the measured current, and an ion resistance of the solid electrolyte membrane was subtracted from the ion resistance of the cell to calculate an ionic resistance of the mixed conductor. The ionic conductivity was calculated from the ionic resistance of the mixed conductor. The partial results of measured ionic conductivity are shown in Table 1.

TABLE 1

| | Composition | Electronic conductivity [S/cm] | Ionic conductivity [S/cm] |
|---|---|---|---|
| Comparative Example 1 | $Li_4Ti_5O_{12}$ | $4.3 \times 10^{-9}$ | $6.8 \times 10^{-8}$ |
| Example 1 | $Li_{4.5}Ti_{4.5}Nb_{0.5}O_{12-\delta}$ | $1.4 \times 10^{-3}$ | $4.7 \times 10^{-5}$ |
| Example 2 | $Li_{3.5}Ti_{4.0}Nb_{1.0}O_{12-\delta}$ | $3.5 \times 10^{-4}$ | $2.0 \times 10^{-7}$ |
| Example 3 | $Li_{3.5}Ti_{4.0}Ta_{1.0}O_{12-\delta}$ | $1.2 \times 10^{-4}$ | $1.8 \times 10^{-7}$ |
| Example 4 | $Li_{4.5}Ti_{4.5}Gd_{0.5}O_{12-\delta}$ | $2.1 \times 10^{-4}$ | $3.2 \times 10^{-7}$ |
| Example 5 | $Li_{5.0}Ti_{4.0}Gd_{1.0}O_{12-\delta}$ | $9.6 \times 10^{-6}$ | $5.1 \times 10^{-6}$ |
| Example 6 | $Li_{4.5}Ti_{4.5}In_{0.5}O_{12-\delta}$ | $7.4 \times 10^{-5}$ | $8.1 \times 10^{-7}$ |
| Example 7 | $Li_{5.0}Ti_{4.0}In_{1.0}O_{12-\delta}$ | $1.1 \times 10^{-5}$ | $2.9 \times 10^{-6}$ |

Referring to Table 1, it was found that the mixed conductors prepared in Examples 1 to 7 had significantly improved electronic conductivity and ionic conductivity, as compared with that of Comparative Example 1.

The electronic conductivity of the mixed conductor was greater than the ionic conductivity of the mixed conductor.

When $Li_4Ti_5O_{12}$ becomes the $Li_4Ti_5O_{12-\delta}$ by introducing an oxygen vacancy, its ionic conductivity was less than previously reported for $Li_4Ti_5O_{12}$, $1.2.10^{-8}$ S/cm.

On the other hand, although the mixed conductors of Examples 1 to 7 each comprise an oxygen vacancy, the ionic conductivities thereof were significantly improved as compared to $Li_4Ti_5O_{12}$.

Evaluation Example 3: Evaluation of XRD Spectrum

The XRD spectra of the mixed conductors of Examples 1 to 3 and Comparative Example 1 were measured. The results thereof are shown in FIG. 1. In each XRD spectrum measurement, Cu Kα radiation was used.

As shown in FIG. 1, the mixed conductors prepared in Examples 1 to 3 showed similar spectra to that of the $Li_4Ti_5O_{12}$ of Comparative Example 1, having a spinel crystal structure. Therefore, the mixed conductors of Examples 1 to 3 were found to have a spinel-type crystal structure.

Also, as shown in FIG. 1, in the cases of the mixed conductors of Examples 1 to 3, new peaks were observed at a diffraction angle (2θ) of 23.5°±2.5°, and the intensity of this new peak (Ib) was greater than the intensity of the peak (Ia) corresponding to a crystal plane (111) of a spinel crystal structure. That is, in the mixed conductors of Examples 1 to 3, a peak intensity ratio (Ia/Ib) of the peak intensity (Ib) at a diffraction angle (2θ) of 23.5°±2.5° to the peak intensity (Ia) corresponding to a crystal plane (111) at a diffraction angle (2θ) of 18°±2.5° was 1 or less.

Although it is not illustrated in the drawings, in an XRD spectrum of the mixed conductor of Example 7, it was found that the mixed conductor further included a phase having a composition of $Li_2TiO_3$ in addition to a phase having a spinel-type crystal structure. The phase having a spinel-type crystal structure in the XRD spectrum of the mixed conductor of Example 7 belonged to an Fd-3m space group.

Although it is not illustrated in the drawings, in an XRD spectrum of the mixed conductor of Example 5, it was found that the mixed conductor further included a phase having a composition of $Gd_2Ti_2O_7$ in addition to a phase having a spinel-type crystal structure.

Evaluation Example 4: Evaluation of Electronic Band Structure

Electronic band structures of $Li_4Ti_5O_{12}$ of Comparative Example 1, $Li_{4.5}Ti_{4.5}Nb_{0.5}O_{12}$ introduced with Nb, which was an additive element of Reference Example 1, $Li_{3.5}Ti_4NbO_{12}$ introduced with Nb, which was an additive element of Reference Example 2, $Li_{3.5}Ti_4TaO_{12}$ introduced with Ta, which was an additive element of Reference Example 3, and $Li_4Ti_5O_{11.5}$ introduced with an oxygen vacancy of Reference Example 4 were calculated. From the calculated result, the band gaps were evaluated.

The electronic structures were calculated using a Vienna Ab-initio simulation package (VASP) based on the framework of density functional theory (DFT). The calculation results are shown in FIG. 2A to 2E and Table 2.

TABLE 2

| | Composition | Band gap [eV] |
|---|---|---|
| Comparative Example 1 | $Li_4Ti_5O_{12}$ | 2.5 |
| Reference Example 1 | $Li_{4.5}Ti_{4.5}Nb_{0.5}O_{12}$ | 0.9 |
| Reference Example 2 | $Li_{3.5}Ti_4NbO_{12}$ | 0.1 |
| Reference Example 3 | $Li_{3.5}Ti_4TaO_{12}$ | 1.1 |
| Reference Example 4 | $Li_4Ti_5O_{11.5}$ | 0.1 |

Figure 2A:
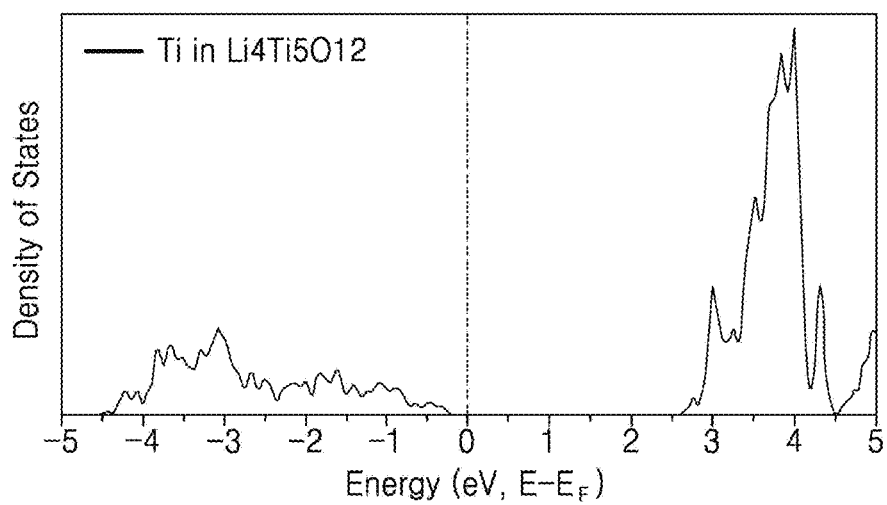
FIG. 2A is a graph of density of states (DOS) versus energy (electron volts, eV) and shows a total density of states of $Li_4Ti_5O_{12}$.
Figure 2B:
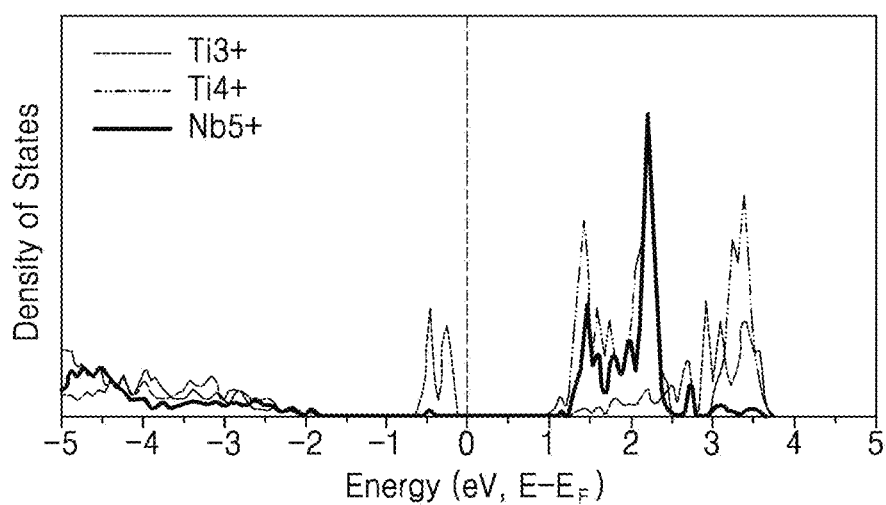
FIG. 2B is a graph of density of states (DOS) versus energy (electron volts, eV) and shows a total DOS of $Li_{4.5}Ti_{4.5}Nb_{0.5}O_{12}$.
Figure 2C:
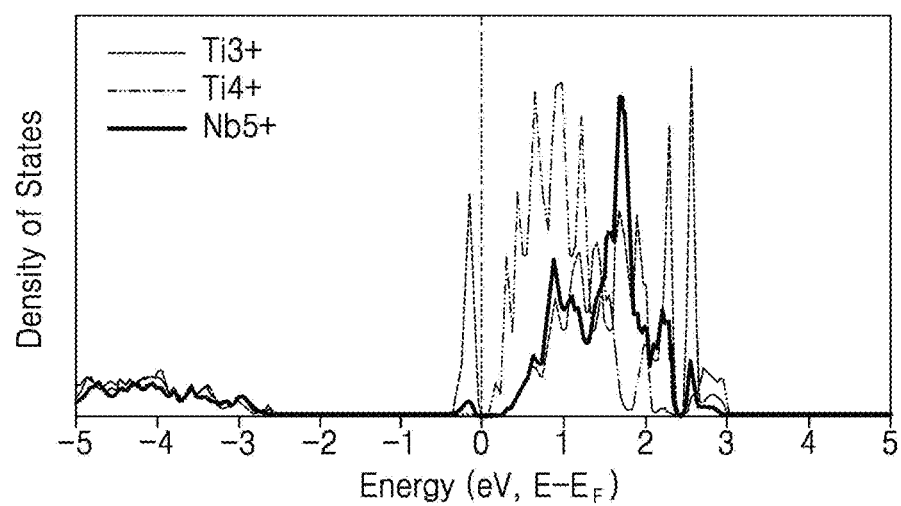
FIG. 2C is a graph of density of states (DOS) versus energy (electron volts, eV) and shows a total DOS of $Li_{3.5}Ti_4NbO_{12}$.
Figure 2D:
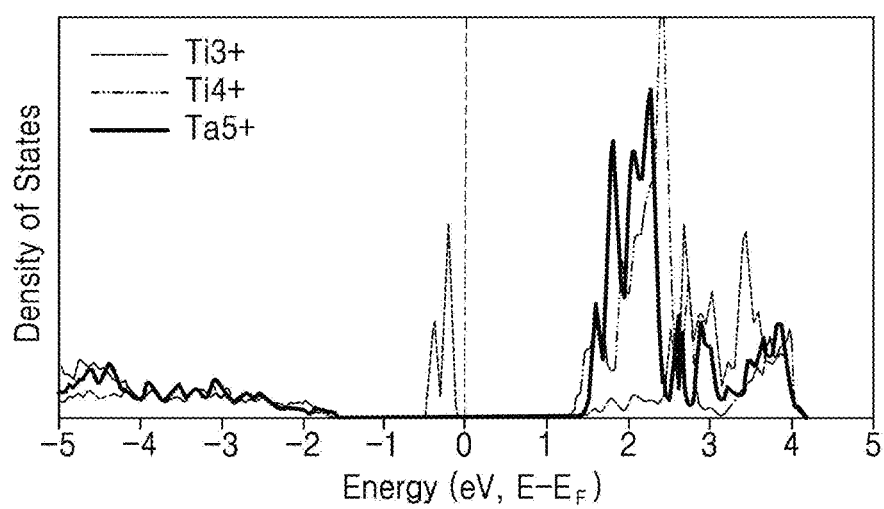
FIG. 2D is a graph of density of states (DOS) versus energy (electron volts, eV) and shows a total DOS of $Li_{3.5}Ti_4TaO_{12}$.
Figure 2E:
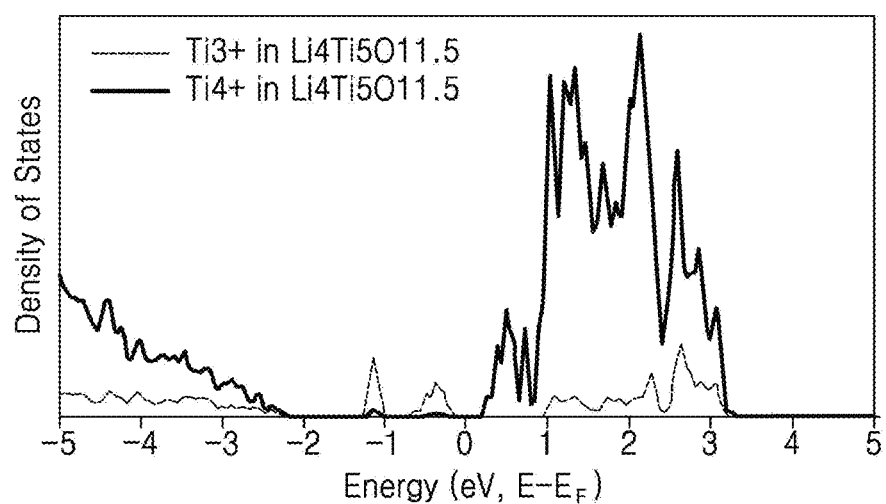
FIG. 2E is a graph of density of states (DOS) versus energy (electron volts, eV) and shows a total DOS of $Li_4Ti_5O_{11.5}$.

As shown in Table 2 and FIG. 2A, a band gap of $Li_4Ti_5O_{12}$ was about 2.5 eV. On the other hand, as shown in Table 2 and FIGS. 2B to 2E, band gaps of $Li_{4.5}Ti_{4.5}Nb_{0.5}O_{12}$, $Li_{3.5}Ti_4NbO_{12}$, $Li_{3.5}Ti_4TaO_{12}$, and $Li_4Ti_5O_{11.5}$ were each 2.0 eV or less.

As shown in FIGS. 2B to 2E, Ti had oxidation numbers of 3 and 4, and Nb and Ta, which are additive elements, each had an oxidation number of 5.

Also, as shown in Table 1 of Evaluation Example 1, the mixed conductor of Example 1 ($Li_{4.5}Ti_{4.5}Nb_{0.5}O_{12-\delta}$) and the mixed conductor of Example 2 ($Li_{3.5}Ti_4NbO_{12-\delta}$), into which an oxygen vacancy and other additive elements having different oxidation numbers were introduced, and the mixed conductor of Example 3 ($Li_{3.5}Ti_4TaO_{12-\delta}$), were found to provide improved electronic conductivity as compared with $Li_4Ti_5O_{12}$ of Comparative Example 1. Therefore, $Li_4Ti_5O_{12}$ was introduced with an oxygen vacancy and an additive element aliovalent from Ti, and thus had a mixed valence state. Accordingly, a band gap thereof decreased, and therefore, the electronic conductivity of the mixed conductor improved. That is, the band gaps of the mixed conductor of Example 1 ($Li_{4.5}Ti_{4.5}Nb_{0.5}O_{12-\delta}$), the mixed conductor of Example 2 ($Li_{3.5}Ti_4NbO_{12-\delta}$), and the mixed conductor of Example 3 ($Li_{3.5}Ti_4TaO_{12-\delta}$) were 2.0 eV or less, which is less than the band gap of $Li_4Ti_5O_{12}$. Thus, the electronic conductivity was found to be improved.

Evaluation Example 5: Evaluation of Lithium Transition Activation Energy (Ea)

As shown in FIG. 3, in $Li_4Ti_5O_{12}$ having a spinel-type crystal structure, lithium was situated at a tetrahedral 8a site 350 and, partially at an octahedral 16d site 370 in the spinel-type crystal structure. Further, as shown in FIG. 3, an octahedral 16c site 360 was situated between two adjacent tetrahedral 8a sites 350 and was sharing faces with the two adjacent tetrahedral 8a sites 350. Lithium conductive characteristics resulted from lithium transition, for example, from a tetrahedral 8a site 350 to another tetrahedral 8a site 350 via an octahedral 16c site 360.

Lithium transition activation energy (Ea) upon transition from a tetrahedral 8a site to another tetrahedral 8a site via an octahedral 16c site was measured. The transition occurred in $Li_4Ti_5O_{12}$ of Comparative Example 1, $Li_{4+x}Ti_5O_{12}$ that additionally included lithium (wherein 0<x), and $Li_{4-x}Ti_5O_{12}$ in which lithium was additionally reduced (wherein 0<x).

The activation energy was calculated using VASP based on the framework of DFT.

In $Li_4Ti_5O_{12}$, an activation energy (Ea, 8a→16c→8a) (i.e., energy barrier) upon lithium transition (or lithium diffusion) from a tetrahedral 8a site to another tetrahedral 8a site via an octahedral 16c site transition was about 0.7 eV or higher.

On the other hand, in $Li_{4+x}Ti_5O_{12}$ (wherein 0<x) and $Li_{4-x}Ti_5O_{12}$ (wherein 0<x), an activation energy (Ea, 8a→16c→8a) upon lithium transition from a tetrahedral 8a site to another tetrahedral 8a site via an octahedral 16c site transition was about 0.5 eV or less.

Also, as shown in Table 1 of Evaluation Example 2, when lithium is further added as in the mixed conductor of Example 1 ($Li_{4.5}Ti_{4.5}Nb_{0.5}O_{12-\delta}$), and when lithium is additionally reduced as in the mixed conductor of Example 2 ($Li_{3.5}Ti_4NbO_{12-\delta}$), the ionic conductivity of each of the mixed conductors improved, as compared with $Li_4Ti_5O_{12}$ of Comparative Example 1.

Therefore, an energy barrier may be lowered upon lithium diffusion by further adding reduced lithium to $Li_4Ti_5O_{12}$, and thus, ionic conductivity of the mixed conductor may be improved.

As apparent from the foregoing description, when the mixed conductor, which is chemically stable and transfers ions and electrons simultaneously, is used, deterioration of an electrochemical device may be prevented.

It should be understood that embodiments described herein should be considered in a descriptive sense only and not for purposes of limitation. Descriptions of features or aspects within each embodiment should be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A mixed conductor represented by Formula 1:

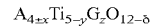

$$A_{4\pm x}Ti_{5-y}G_zO_{12-\delta} \qquad \text{Formula 1}$$

wherein, in Formula 1,
A is a monovalent cation,
G is at least one of a monovalent cation, a divalent cation, a trivalent cation, a tetravalent cation, a pentavalent cation, or a hexavalent cation, with the proviso that G is not Ti or Cr, and
0<x<2, 0.3<y<5, 0<z<5, and 0<δ≤3,
wherein the mixed conductor comprises a phase having a spinel-type crystal structure, and
wherein, in an X-ray diffraction spectrum of the mixed conductor, a peak intensity ratio of an intensity of a peak corresponding to a (111) crystal plane at a diffraction angle 2θ of 18°±2.5° to an intensity of a peak at a diffraction angle 2θ of 23.5°±2.5° is 0.001 to 1.

2. The mixed conductor of claim 1, wherein
A is a monovalent alkali metal cation, and
G is at least one of a divalent cation, a trivalent cation, a tetravalent cation, a pentavalent cation, or a hexavalent cation, with the proviso that G is not Ti or Cr.

3. The mixed conductor of claim 2, wherein A is at least one of Li, Na, or K.

4. The mixed conductor of claim 2, wherein G is at least one of Mg, Ca, Sr, Sc, Y, La, Ce, Pr, Nd, Sm, Eu, Gd, Tb, Dy, Ho, Er, Tm, Yb, Lu, Zr, Hf, V, Nb, Ta, Mo, W, Mn, Tc, Re, Fe, Ru, Os, Co, Rh, Ir, Ni, Pd, Pt, Cu, Ag, Au, Zn, Cd, Hg, Al, Ga, In, Tl, Ge, Sn, Pb, Sb, Bi, Po, As, Se, or Te.

5. The mixed conductor of claim 1, wherein A is Li, and
G is at least one of Mg, Ca, Sr, Sc, Y, La, Ce, Pr, Nd, Sm, Eu, Gd, Tb, Dy, Ho, Er, Tm, Yb, Lu, Zr, Hf, V, Nb, Ta, Mo, W, Mn, Tc, Re, Fe, Ru, Os, Co, Rh, Ir, Ni, Pd, Pt, Cu, Ag, Au, Zn, Cd, Hg, Al, Ga, In, Tl, Ge, Sn, Pb, Sb, or Bi, Po, As, Se, or Te, and
wherein 0.3<x<2, 0.3<y<2, 0.3<z<2, and 0<δ≤3.

6. The mixed conductor of claim 5, wherein the mixed conductor comprises at least one of $Li_{4\pm x}Ti_{5-y}Mg_zO_{12-\delta}$ wherein $0.4<x\le1$, $0.4<y\le1$, $0.4<z\le1$, and $0<\delta\le3$, $Li_{4\pm x}Ti_{5-y}Ca_zO_{12-\delta}$ wherein $0.4<x\le1$, $0.4<y\le1$, $0.4<z\le1$, and $0<\delta\le3$, $Li_{4\pm x}Ti_{5-y}Sr_zO_{12-\delta}$ wherein $0.4<x\le1$, $0.4<y\le1$, $0.4<z\le1$, and $0<\delta\le3$, $Li_{4\pm x}Ti_{5-y}Sc_zO_{12-\delta}$ wherein $0.4<x\le1$, $0.4<y\le1$, $0.4<z\le1$, and $0<\delta\le3$, $Li_{4\pm x}Ti_{5-y}Y_zO_{12-\delta}$ wherein $0.4<x\le1$, $0.4<y\le1$, $0.4<z\le1$, and $0<\delta\le3$, $Li_{4\pm x}Ti_{5-y}La_zO_{12-\delta}$ wherein $0.4<x\le1$, $0.4<y\le1$, $0.4<z\le1$, and $0<\delta\le3$, $Li_{4\pm x}Ti_{5-y}Ce_zO_{12-\delta}$ wherein $0.4<x\le1$, $0.4<y\le1$, $0.4<z\le1$, and $0<\delta\le3$, $Li_{4\pm x}Ti_{5-y}Pr_zO_{12-\delta}$ wherein $0.4<x\le1$, $0.4<y\le1$, $0.4<z\le1$, and $0<\delta\le3$, $Li_{4\pm x}Ti_{5-y}Nd_zO_{12-\delta}$ wherein $0.4<x\le1$, $0.4<y\le1$, $0.4<z\le1$, and $0<\delta\le3$, $Li_{4\pm x}Ti_{5-y}Sm_zO_{12-\delta}$ wherein $0.4<x\le1$, $0.4<y\le1$, $0.4<z\le1$, and $0<\delta\le3$, $Li_{4\pm x}Ti_{5-y}Eu_zO_{12-\delta}$ wherein $0.4<x\le1$, $0.4<y\le1$, $0.4<z\le1$, and $0<\delta\le3$, $Li_{4\pm x}Ti_{5-y}Gd_zO_{12-\delta}$ wherein $0.4<x\le1$, $0.4<y\le1$, $0.4<z\le1$, and $0<\delta\le3$, $Li_{4\pm x}Ti_{5-y}Tb_zO_{12-\delta}$ wherein $0.4<x\le1$, $0.4<y\le1$, $0.4<z\le1$, and $0<\delta\le3$, $Li_{4\pm x}Ti_{5-y}Dy_zO_{12-\delta}$ wherein $0.4<x\le1$, $0.4<y\le1$, $0.4<z\le1$, and $0<\delta\le3$, $Li_{4\pm x}Ti_{5-y}Ho_zO_{12-\delta}$ wherein $0.4<x\le1$, $0.4<y\le1$, $0.4<z\le1$, and $0<\delta\le3$, $Li_{4\pm x}Ti_{5-y}Er_zO_{12-\delta}$ wherein $0.4<x\le1$, $0.4<y\le1$, $0.4<z\le1$, and $0<\delta\le3$, $Li_{4\pm x}Ti_{5-y}Tm_zO_{12-\delta}$ wherein $0.4<x\le1$, $0.4<y\le1$, $0.4<z\le1$, and $0<\delta\le3$, $Li_{4\pm x}Ti_{5-y}Yb_zO_{12-\delta}$ wherein $0.4<x\le1$, $0.4<y\le1$, $0.4<z\le1$, and $0<\delta\le3$, $Li_{4\pm x}Ti_{5-y}Lu_zO_{12-\delta}$ wherein $0.4<x\le1$, $0.4<y\le1$, $0.4<z\le1$, and $0<\delta\le3 Li_{4\pm x}Ti_{5-y}Zr_zO_{12-\delta}$ wherein $0.4<x\le1$, $0.4<y\le1$, $0.4<z\le1$, and $0<\delta\le3$, $Li_{4\pm x}Ti_{5-y}Hf_zO_{12-\delta}$ wherein $0.4<x\le1$, $0.4<y\le1$, $0.4<z\le1$, and $0<\delta\le3$, $Li_{4\pm x}Ti_{5-y}V_zO_{12-\delta}$ wherein $0.4<x\le1$, $0.4<y\le1$, $0.4<z\le1$, and $0<\delta\le3$, $Li_{4\pm x}Ti_{5-y}Nb_zO_{12-\delta}$ wherein $0.4<x\le1$, $0.4<y\le1$, $0.4<z\le1$, and $0<\delta\le3$, $Li_{4\pm x}Ti_{5-y}Ta_zO_{12-\delta}$ wherein $0.4<x\le1$, $0.4<y\le1$, $0.4<z\le1$, and $0<\delta\le3$, $Li_{4\pm x}Ti_{5-y}Mo_zO_{12-\delta}$ wherein $0.4<x\le1$, $0.4<y\le1$, $0.4<z\le1$, and $0<\delta\le3$, $Li_{4\pm x}Ti_{5-y}W_zO_{12-\delta}$ wherein $0.4<x\le1$, $0.4<y\le1$, $0.4<z\le1$, and $0<\delta\le3$, $Li_{4\pm x}Ti_{5-y}Mn_zO_{12-\delta}$ wherein $0.4<x\le1$, $0.4<y\le1$, $0.4<z\le1$, and $0<\delta\le3$, $Li_{4\pm x}Ti_{5-y}Tc_zO_{12-\delta}$ wherein $0.4<x\le1$, $0.4<y\le1$, $0.4<z\le1$, and $0<\delta\le3$, $Li_{4\pm x}Ti_{5-y}Re_zO_{12-\delta}$ wherein $0.4<x\le1$, $0.4<y\le1$, $0.4<z\le1$, and $0<\delta\le3$, $Li_{4\pm x}Ti_{5-y}Fe_zO_{12-\delta}$ wherein $0.4<x\le1$, $0.4<y\le1$, $0.4<z\le1$, and $0<\delta\le3$, $Li_{4\pm x}Ti_{5-y}Ru_zO_{12-\delta}$ wherein $0.4<x\le1$, $0.4<y\le1$, $0.4<z\le1$, and $0<\delta\le3$, $Li_{4\pm x}Ti_{5-y}Os_zO_{12-\delta}$ wherein $0.4<x\le1$, $0.4<y\le1$, $0.4<z\le1$, and $0<\delta\le3$, $Li_{4\pm x}Ti_{5-y}Co_zO_{12-\delta}$ wherein $0.4<x\le1$, $0.4<y\le1$, $0.4<z\le1$, and $0<\delta\le3$, $Li_{4\pm x}Ti_{5-y}Rh_zO_{12-\delta}$ wherein $0.4<x\le1$, $0.4<y\le1$, $0.4<z\le1$, and $0<\delta\le3$, $Li_{4\pm x}Ti_{5-y}Ir_zO_{12-\delta}$ wherein $0.4<x\le1$, $0.4<y\le1$, $0.4<z\le1$, and $0<\delta\le3$, $Li_{4\pm x}Ti_{5-y}Ni_zO_{12-\delta}$ wherein $0.4<x\le1$, $0.4<y\le1$, $0.4<z\le1$, and $0<\delta\le3$, $Li_{4\pm x}Ti_{5-y}Pd_zO_{12-\delta}$ wherein $0.4<x\le1$, $0.4<y\le1$, $0.4<z\le1$, and $0<\delta\le3$, $Li_{4\pm x}Ti_{5-y}Pt_zO_{12-\delta}$ wherein $0.4<x\le1$, $0.4<y\le1$, $0.4<z\le1$, and $0<\delta\le3$, $Li_{4\pm x}Ti_{5-y}Cu_zO_{12-\delta}$ wherein $0.4<x\le1$, $0.4<y\le1$, $0.4<z\le1$, and $0<\delta\le3$, $Li_{4\pm x}Ti_{5-y}Ag_zO_{12-\delta}$ wherein $0.4<x\le1$, $0.4<y\le1$, $0.4<z\le1$, and $0<\delta\le3$, $Li_{4\pm x}Ti_{5-y}Au_zO_{12-\delta}$ wherein $0.4<x\le1$, $0.4<y\le1$, $0.4<z\le1$, and $0<\delta\le3$, $Li_{4\pm x}Ti_{5-y}Zn_zO_{12-\delta}$ wherein $0.4<x\le1$, $0.4<y\le1$, $0.4<z\le1$, and $0<\delta\le3$, $Li_{4\pm x}Ti_{5-y}Cd_zO_{12-\delta}$ wherein $0.4<x\le1$, $0.4<y\le1$, $0.4<z\le1$, and $0<\delta\le3$, $Li_{4\pm x}Ti_{5-y}Hg_zO_{12-\delta}$ wherein $0.4<x\le1$, $0.4<y\le1$, $0.4<z\le1$, $Li_{4\pm x}Ti_{5-y}Al_zO_{12-\delta}$ wherein $0.4<x\le1$, $0.4<y\le1$, $0.4<z\le1$, and $0<\delta\le3$, $Li_{4\pm x}Ti_{5-y}Ga_zO_{12-\delta}$ wherein $0.4<x\le1$, $0.4<y\le1$, $0.4<z\le1$, and $0<\delta\le3$, $Li_{4\pm x}Ti_{5-y}In_zO_{12-\delta}$ wherein $0.4<x\le1$, $0.4<y\le1$, $0.4<z\le1$, and $0<\delta\le3$, $Li_{4\pm x}Ti_{5-y}Tl_zO_{12-\delta}$ wherein $0.4<x\le1$, $0.4<y\le1$, $0.4<z\le1$, and $0<\delta\le3$, $Li_{4\pm x}Ti_{5-y}Ge_zO_{12-\delta}$ wherein $0.4<x\le1$, $0.4<y\le1$, $0.4<z\le1$, and $0<\delta\le3$, $Li_{4\pm x}Ti_{5-y}Sn_zO_{12-\delta}$ wherein $0.4<x\le1$, $0.4<y\le1$, $0.4<z\le1$, and $0<\delta\le3$, $Li_{4\pm x}Ti_{5-y}Pb_zO_{12-\delta}$ wherein $0.4<x\le1$, $0.4<y\le1$, $0.4<z\le1$, and $0<\delta\le3$, $Li_{4\pm x}Ti_{5-y}Sb_zO_{12-\delta}$ wherein $0.4<x\le1$, $0.4<y\le1$, $0.4<z\le1$, and $0<\delta\le3$, $Li_{4\pm x}Ti_{5-y}Bi_zO_{12-\delta}$ wherein $0.4<x\le1$, $0.4<y\le1$, $0.4<z\le1$, and $0<\delta\le3$, $Li_{4\pm x}Ti_{5-y}Po_zO_{12-\delta}$ wherein $0.4<x\le1$, $0.4<y\le1$, $0.4<z\le1$, and $0<\delta\le3$, $Li_{4\pm x}Ti_{5-y}As_zO_{12-\delta}$ wherein $0.4<x\le1$, $0.4<y\le1$, $0.4<z\le1$, and $0<\delta\le3$, and $0<\delta_{4\pm x}Ti_{5-y}Se_zO_{12-\delta}$ wherein $0.4<x\le1$, $0.4<y\le1$, $0.4<z\le1$, and $0<\delta\le3$, or $Li_{4\pm x}Ti_{5-y}Te_zO_{12-\delta}$ wherein $0.4<x\le1$, $0.4<y\le1$, $0.4<z\le1$, and $0<\delta\le3$.

7. The mixed conductor of claim 1, wherein an electronic conductivity of the mixed conductor is greater than an ionic conductivity of the mixed conductor.

8. The mixed conductor of claim 1, wherein an electronic conductivity of the mixed conductor is $1.0\times10^{-6}$ Siemens per centimeter to 1.0 Siemens per centimeter at 25° C.

9. The mixed conductor of claim 1, wherein an ionic conductivity of the mixed conductor is $1.0\times10^{-7}$ Siemens per centimeter to $1.0\times10^{-1}$ Siemens per centimeter at 25° C.

10. The mixed conductor of claim 1, wherein the mixed conductor comprises a second phase which is different from a phase having a spinel-type crystal structure.

11. The mixed conductor of claim 10, wherein the second phase comprises at least one of $Li_2TiO_3$, $Gd_2Ti_2O_7$, $GdTiO_3$, $LiNbO_3$, or $Nb_2O_5$.

12. The mixed conductor of claim 1, wherein the phase having a spinel-type crystal structure belongs to an Fd-3m space group.

13. The mixed conductor of claim 1, wherein a band gap between a valence band and a conduction band of the mixed conductor is less than a band gap between a valence band and a conduction band of $Li_4Ti_5O_{12}$.

14. The mixed conductor of claim 1, wherein a band gap between a valence band and a conduction band of the mixed conductor is 0.001 electron volts to 2 electron volts.

15. The mixed conductor of claim 1, wherein Ti has an oxidation number between 3 and 4.

16. The mixed conductor of claim 1, wherein G has an oxidation number which is different from an oxidation number of Ti.

17. The mixed conductor of claim 1, wherein A is disposed on at least one of a tetrahedral $8a$ site, an octahedral $16c$ site, and an octahedral $16d$ site of a spinel-type crystal structure, and when A is lithium, an activation energy for a lithium transition from the tetrahedral $8a$ site to another tetrahedral $8a$ site via the octahedral $16c$ site of the mixed conductor is less than an activation energy for lithium transition from a tetrahedral $8a$ site to another tetrahedral $8a$ site via an octahedral $16c$ site of $Li_4Ti_5O_{12}$.

18. An electrode comprising the mixed conductor of claim 1.

19. An electrochemical device comprising:
a positive electrode;
a negative electrode; and
a separator between the positive electrode and the negative electrode,
wherein at least one of the positive electrode or the negative electrode comprises the electrode of claim 18.

20. The electrochemical device of claim 19, wherein the electrochemical device is a battery, an accumulator, a supercapacitor, a fuel cell, a sensor, or an electrochromic device.

21. The electrochemical device of claim 20, wherein the battery is a lithium-air battery.

22. A method of preparing a mixed conductor, the method comprising:
providing a mixture comprising an element A precursor, a titanium precursor, and an element G precursor,
wherein the element A precursor provides a monovalent cation, and the element G precursor provides at least one of a monovalent cation, a divalent cation, a trivalent cation, a tetravalent cation, a pentavalent cation, or a hexavalent cation, with the proviso that G is not Ti or Cr; and
heat-treating the mixture to prepare the mixed conductor, wherein the mixed conductor is represented by Formula 1

$$A_{4\pm x}Ti_{5-y}G_zO_{12-\delta} \quad \text{Formula 1}$$

wherein, in Formula 1,
A is a monovalent cation,
G is at least one of a monovalent cation, a divalent cation, a trivalent cation, a tetravalent cation, a pentavalent cation, or a hexavalent cation, with the proviso that G is not Ti or Cr, and
$0<x<2$, $0.3<y<5$, $0<z<5$, and $0<\delta\leq3$,
wherein the mixed conductor comprises a phase having a spinel-type crystal structure, and
wherein, in an X-ray diffraction spectrum of the mixed conductor, a peak intensity ratio of an intensity of a peak corresponding to a (111) crystal plane at a diffraction angle 2θ of 18°±2.5° to an intensity of a peak at a diffraction angle 2θ of 23.5°±2.5° is 0.001 to 1.

23. The method of claim 22, wherein the element A precursor is a salt of A or an oxide of A, the titanium precursor is a titanium salt or a titanium oxide, and the element G precursor is a salt of G or an oxide of G.

24. The method of claim 22, wherein the heat-treating of the mixture to prepare the mixed conductor comprises:
drying the mixture;
heat-treating the mixture under an oxidative atmosphere to provide a primary heat-treated mixture;
pulverizing the primary heat-treated mixture;
pressing the pulverized primary heat-treated mixture to prepare a pellet; and
heat-treating the pellet under a reductive atmosphere, an oxidative atmosphere, or an oxidative atmosphere and a reductive atmosphere to prepare the mixed conductor.

25. The method of claim 24, wherein the primary heat-treating is performed at a temperature in a range of 600° C. to 1,000° C. for 2 hours to 10 hours, and the secondary heat-treating is performed at a temperature in a range of 700° C. to 1,400° C. for 6 hours to 48 hours.

* * * * *